(12) United States Patent
Phelan et al.

(10) Patent No.: US 7,904,327 B2
(45) Date of Patent: Mar. 8, 2011

(54) MARKETING OPTIMIZATION SYSTEM

(75) Inventors: William L. Phelan, Acton, MA (US);
Jeffrey Q. Reagen, Mendon, MA (US);
Carol R. Peo, Stow, MA (US); Michael L. J. Hackney, Groton, MA (US); Ellen Pedersen, Medfield, MA (US); Michael P. Skrzypczak, Hopkinton, MA (US);
John C. Wells, Weston, MA (US)

(73) Assignee: SAS Institute Inc., Cary, NC (US)

( * ) Notice: Subject to any disclaimer, the term of this patent is extended or adjusted under 35 U.S.C. 154(b) by 1608 days.

(21) Appl. No.: 10/426,596

(22) Filed: Apr. 30, 2003

(65) Prior Publication Data

US 2004/0093296 A1    May 13, 2004

Related U.S. Application Data

(60) Provisional application No. 60/376,495, filed on Apr. 30, 2002.

(51) Int. Cl.
*G06F 170/60*    (2006.01)
(52) U.S. Cl. .................. 705/10; 705/14.7; 705/14.18
(58) Field of Classification Search .............. 705/14, 705/14.7, 14.18, 14.1
See application file for complete search history.

(56) References Cited

U.S. PATENT DOCUMENTS

| | | | |
|---|---|---|---|
| 5,627,973 A | 5/1997 | Armstrong et al. | |
| 5,652,842 A | 7/1997 | Siegrist, Jr. et al. | |
| 5,767,854 A | 6/1998 | Anwar | |
| 5,799,286 A | 8/1998 | Morgan et al. | |
| 5,926,820 A | 7/1999 | Agrawal et al. | |
| 5,953,707 A | 9/1999 | Huang et al. | 705/10 |
| 5,963,910 A | 10/1999 | Ulwick | |
| 5,999,908 A | 12/1999 | Abelow | 705/1 |
| 6,009,407 A | 12/1999 | Garg | |
| 6,014,640 A | 1/2000 | Bent | |
| 6,029,139 A | 2/2000 | Cunningham et al. | |
| 6,078,892 A | 6/2000 | Anderson et al. | |
| 6,115,691 A | 9/2000 | Ulwick | |
| 6,151,582 A | 11/2000 | Huang et al. | 705/8 |
| 6,182,060 B1 | 1/2001 | Hedgcock et al. | |
| 6,236,977 B1 | 5/2001 | Verba et al. | |

(Continued)

FOREIGN PATENT DOCUMENTS

WO    WO 01/11522    2/2001

OTHER PUBLICATIONS

Baud, Nicolas et al., "Internal data, external data and consortium data for operational risk measurement: How to pool data properly?", Groupe de Recherche Operationnelle, Credit Lyonnais, France, pp. 1-18 (Jun. 1, 2002).

(Continued)

*Primary Examiner* — John G Weiss
*Assistant Examiner* — Michael Goldman
(74) *Attorney, Agent, or Firm* — Jones Day

(57) ABSTRACT

A marketing optimization module automatically obtaining multi-dimensional marketing data from a market client. The marketing optimization module automatically organizes at least a part of the multi-dimensional marketing data into one or more marketing categories. The marketing optimization module then analyzes all of or a part of the multi-dimensional marketing data to facilitate the optimization of a marketing investment.

27 Claims, 31 Drawing Sheets

U.S. PATENT DOCUMENTS

| | | | |
|---|---|---|---|
| 6,237,138 B1 | 5/2001 | Hameluck et al. | |
| 6,249,768 B1 | 6/2001 | Tulskie, Jr. et al. | 705/7 |
| 6,275,812 B1 | 8/2001 | Haq et al. | |
| 6,286,005 B1 | 9/2001 | Cannon | |
| 6,321,206 B1 | 11/2001 | Honarvar | |
| 6,341,240 B1 * | 1/2002 | Bermon et al. | 700/97 |
| 6,397,224 B1 | 5/2002 | Zubeldia et al. | |
| 6,456,999 B1 | 9/2002 | Netz | |
| 6,470,344 B1 | 10/2002 | Kothuri et al. | |
| 6,484,179 B1 | 11/2002 | Roccaforte | |
| 6,502,077 B1 | 12/2002 | Speicher | |
| 6,526,526 B1 | 2/2003 | Dong et al. | |
| 6,546,135 B1 | 4/2003 | Lin et al. | |
| 6,581,068 B1 | 6/2003 | Bensoussan et al. | |
| 6,584,447 B1 | 6/2003 | Fox et al. | |
| 6,611,829 B1 | 8/2003 | Tate et al. | |
| 6,640,215 B1 | 10/2003 | Galperin et al. | |
| 6,728,724 B1 | 4/2004 | Megiddo et al. | |
| 6,735,570 B1 | 5/2004 | Lacy et al. | |
| 6,750,864 B1 | 6/2004 | Anwar | |
| 6,898,603 B1 | 5/2005 | Petculescu et al. | |
| 6,901,406 B2 | 5/2005 | Nabe et al. | |
| 6,907,382 B2 | 6/2005 | Urokohara | |
| 6,970,830 B1 | 11/2005 | Samra et al. | |
| 7,031,955 B1 * | 4/2006 | de Souza et al. | 707/3 |
| 7,039,594 B1 * | 5/2006 | Gersting | 705/7 |
| 7,089,266 B2 | 8/2006 | Stolte et al. | |
| 7,092,929 B1 * | 8/2006 | Dvorak et al. | 705/28 |
| 7,133,876 B2 | 11/2006 | Roussopoulos et al. | |
| 7,346,538 B2 * | 3/2008 | Reardon | 705/10 |
| 7,370,366 B2 | 5/2008 | Lacan et al. | |
| 7,526,434 B2 * | 4/2009 | Sharp | 705/10 |
| 7,698,163 B2 * | 4/2010 | Reed et al. | 705/10 |
| 7,777,743 B2 * | 8/2010 | Pao et al. | 345/428 |
| 2002/0013757 A1 | 1/2002 | Bykowsky et al. | |
| 2002/0046096 A1 | 4/2002 | Srinivasan et al. | |
| 2002/0072953 A1 | 6/2002 | Michlowitz et al. | |
| 2002/0107723 A1 | 8/2002 | Benjamin et al. | |
| 2002/0116237 A1 | 8/2002 | Cohen et al. | |
| 2002/0123930 A1 | 9/2002 | Boyd et al. | |
| 2002/0169654 A1 | 11/2002 | Santos et al. | |
| 2002/0169655 A1 | 11/2002 | Beyer et al. | |
| 2002/0178049 A1 | 11/2002 | Bye | |
| 2003/0023598 A1 | 1/2003 | Janakiraman et al. | |
| 2003/0078830 A1 | 4/2003 | Wagner et al. | |
| 2003/0083924 A1 | 5/2003 | Lee et al. | |
| 2003/0083925 A1 | 5/2003 | Weaver et al. | |
| 2003/0088458 A1 | 5/2003 | Afeyan et al. | |
| 2003/0097292 A1 | 5/2003 | Chen et al. | |
| 2003/0110072 A1 | 6/2003 | Delurgio et al. | |
| 2003/0110080 A1 | 6/2003 | Tsutani et al. | |
| 2003/0120584 A1 | 6/2003 | Zarefoss et al. | |
| 2003/0126010 A1 | 7/2003 | Barns-Slavin | |
| 2003/0208402 A1 | 11/2003 | Bibelnieks et al. | |
| 2003/0208420 A1 | 11/2003 | Kansal | |
| 2003/0236721 A1 | 12/2003 | Plumer et al. | |
| 2004/0093296 A1 | 5/2004 | Phelan et al. | |
| 2004/0111388 A1 | 6/2004 | Boiscuvier et al. | |
| 2004/0199781 A1 | 10/2004 | Erickson et al. | |
| 2005/0033761 A1 | 2/2005 | Guttman et al. | |
| 2005/0066277 A1 | 3/2005 | Leah et al. | |
| 2005/0262108 A1 | 11/2005 | Gupta | |
| 2007/0055482 A1 | 3/2007 | Goodermote et al. | |
| 2007/0174119 A1 | 7/2007 | Ramsey et al. | |
| 2007/0233621 A1 * | 10/2007 | de Souza et al. | 706/11 |

OTHER PUBLICATIONS

Na, H.S. et al., "Data Scaling for Operational Risk Modelling", ERIM Report Series Research in Management, 24 pp. (Dec. 2005).

Peemoller, Fred A., "Operational Risk Data Pooling", Frankfurt/Main, Deutsche Bank AG, 38 pp. (Feb. 7, 2002).

Model1 by Group 1 Software, www.g1.com, Aug. 29, 1999, pp. 1-16, retrieved from Google.com and archive.org.

SAS Institute, Inc., www.sas.com, Jan. 29, 1998, pp. 1-28, retrieved from Google.com and archive.org.

Hollander, Geoffrey, "Modell deftly parses customer characteristics", InfoWorld, May 25, 1998, vol. 20, No. 21, pp. 1-4, , retrieved from Dialog, file 148.

"Unica Releases Model 1 Enterprise Edition", Business Wire, Oct. 29, 1998, pp. 1-3, retrieved from Proquest Direct.

Rosen, Michele, "There's Gold in That There Data", Insurance & Technology, Dec. 1998, vol. 23, No. 12, pp. 1-6, , retrieved from Dialog, file 16.

Saarenvirta, Data Mining to Improve Profitability, CMA Magazine, vol. 72, No. 2, Mar. 1998, pp. 8-12.

Johnson et al, Recent Developments and Future Directions in Mathematical Programming, IBM Systems Journal, vol. 31, No. 1, 1992, p. 79-93.

Balintfy et al, Binary and Chain Comparisons with an Experimental Linear Programming Food Price Index, The Review of Economics and Statistics, vol. 52, No. 3, Aug. 1970, pp. 324-330.

Manchanda et al, The "Shopping Basket"; A Model for Multi-Category Purchase Incidence Decisions, Marketing Science, vol. 18, No. 2, 1999, pp. 95-114.

Data Mining News, Looking Past Automation, MarketSwitch Focuses on Optimization of Marketing Campaigns, Data Mining News, May 10, 1999.

Porter-Kuchay, Multidimensional Marketing, Target Marketing, Jan. 2000.

Spiegelman, Optimizers Assist in Specialized marketing Efforts, Computer Reseller News, Nov. 22, 1999.

Horngren, Charles T. et al., "Cost Accounting A Managerial Emphasis", Tenth Edition, Chapter 14, pp. 497-534, 2000.

"Advances in Mathematical Programming and Optimization in the SAS System" by Keamey, SAS Institute, SUGI Proceedings, 1999.

"SAS/OR Optimization Procedures, with Applications to the Oil Industry" by Cohen et al, SAS Institute, SUGI Proceedings, 1994.

"Supply chain design and analysis: models and methods" by Beamon, International Journal of Production Economics, 1998.

"An effective supplier development methodology for enhancing supply chain performance" by Lee et al, ICMIT, 2000.

"Perfect and Open Ratings Form Alliance to Provide Critical Supplier Performance Ratings to Private Exchanges and Net Markets", Business Wire, Oct. 30, 2000.

"12 Technologies: i2 releases i2 five.two-the complete platform for dynamic value chain management; flexible, intuitive, powerful solutions designed to help companies gain efficiencies and drive revenue", M2 Presswire, Oct. 25, 2001.

"Simulation Optimization Using Soft Computing" by Andres Medaglia, PhD dissertation for Operations Research Department at North Carolina State University, Jan. 24, 2001.

"Supplier Selection and Management system Considering Relationships in Supply Chain Management" by Lee et al, IEEE Transactions on Engineering Management, Aug. 2001.

"Solver setting for optimal solutions" by Ananda Samudhram, New Straits Times, Nov. 22, 1999.

"Evaluating Suppliers of Complex Systems: A multiple criteria approach" by Cook et al, The Journal of the Operational Research Society, Nov. 1992.

International Search Report PCT/US03/13394, (3 pgs.).

* cited by examiner

| TRANSFORMATION EXPRESSION | BUSINESS DRIVER | COEFFICIENTS |
|---|---|---|
| LOG(([NetworkTV]/10000)+1) | NetworkTV | 1,000 |
| LOG(([NetworkTV]/10000)+1) | NetworkTV | 1,000 |
| LOG(([NetworkSpotTV]/10000)+1) | NetworkSpotTV | 1,000, 1,000 |
| LOG(([NationalCableTV]/10000)+1) | NationalCableTV | 1,000 |
| LOG(([LocalCableTV]/10000)+1) | LocalCableTV | 1,000 |
| LOG(([DRTV]/10000)+1) | DRTV | 1,000 |
| LOG(([NationalRadio]/10000)+1) | NationalRadio | 1,000 |
| LOG(([SpotRadio]/10000)+1) | SpotRadio | 1,000 |
| LOG(([NationalMagazine]/10000)+1) | NationalMagazine | 1,000 |
| LOG(([LocalMagazine]/10000)+1) | LocalMagazine | 1,000 |
| LOG(([DirectMail]/10000)+1) | DirectMail | 1,000 |
| LOG(([LocalNewspaper]/10000)+1) | LocalNewspaper | 1,000 |
| LOG(([Transit]/10000)+1) | Transit | 1,000 |
| LOG(([TradeShows]/10000)+1) | TradeShows | 1,000 |
| LOG(([NationalNewspaper]/10000)+1) | NationalNewspaper | 1,000 |
| LOG(([Billboards]/10000)+1) | Billboards | 1,000 |
| LOG(([DirectMail] * [SpotRadio]/ 10000)+1) | DirectMail & SpotRadio | 1,000 |
| LOG((([NetworkTV]*[SpotRadio]/100000 000)+1) | NetworkTV & SpotRadio | 1,000 |
| EXP([NasdaqIndex]/1000) | NasdaqIndex | 1,000 |
| [Winter01] | Winter01 | 1,000 |
| [Spring01] | Spring01 | 200 |
| [Fall01] | Fall01 | 1,000 |
| [xmas01] | xmas01 | 300 |
| [Winter02] | Winter02 | 1,000 |
| [Spring02] | Spring02 | 200 |
| [Fall02] | Fall02 | 1,000 |
| [xmas02] | xmas02 | 300 |

FIG. 10

POWERED BY VERIDIEM™

HOME  PERFORMANCE MONITOR  SIMULATOR  PLANNER  ANALYTICS WORKBENCH  ADMIN  LOGOUT  HELP

MARKETING OPTIMIZATION SYSTEM

COMMON TASKS
- Show Data Status
- View Plan
- View Activity Calendar
- Analyze plan Performance
- Compare Plan vs Actual
- Perform Budget Analysis

OTHER TASKS
- Format for Radio
- E-Mail Page
- Send Alert

ALERTS

PLANNER
Network Television Advertising Plan for Model Line 1
Starting June 1, 2002 to August 31, 2002

Network TV    102 Ads    $6,558,750 invested

| # spots | Cost | Network | Program | Start Date | End Date | GRP | Day Part | Impressions | CPI |
|---|---|---|---|---|---|---|---|---|---|
| 10 | $1,350,000 | CBS | Survivor III - The Startup | 1-Apr-2002 | 1-Jun-2001 | 30 | Prime Time | | |
| 5 | $1,550,500 | NBC | West Wing | 1-May-2002 | 1-Jul-2001 | 20 | Prime Time | | |
| 15 | $200,000 | ABC | Good Morning America | 1-Apr-2002 | 1-Aug-2001 | 30 | Early Morning | | |
| 15 | $650,500 | FOX | Boston Public | 1-Apr-2002 | 1-Jul-2001 | 16 | Prime Time | | |
| 10 | $510,250 | NBC | Fear Factor | 1-May-2002 | 30-Aug-2001 | 12 | Prime Time | | |
| 12 | $636,000 | FOX | 24 | 1-Apr-2002 | 31-Jul-2001 | 14 | Prime Time | | |
| 5 | $230,750 | ABC | Nightline | 1-May-2002 | 1-Aug-2001 | 9 | Late Night | | |
| 15 | $650,000 | CBS | The Early Show | 1-May-2002 | 30-Aug-2001 | 10 | Early Morning | | |
| 10 | $450,750 | NBC | Today | 1-Apr-2002 | 1-Jul-2001 | 15 | Early Morning | | |
| 5 | $330,000 | CBS | Late Show w/Letterman | 1-May-2002 | 30-Aug-2001 | 14 | Late Night | | |

MARKETING OPTIMIZATION SYSTEM

POWERED BY VERIDIEM™

HOME | PERFORMANCE MONITOR | SIMULATOR | PLANNER | ANALYTICS WORKBENCH | ADMIN | LOGOUT | HELP

SIMULATOR
Revise Plan for Scenario: Alt Plan # 1 for 2002
Units: Budget Dollars    Dates: Jan-02 to Dec-02

View By: Budget Dollars

Budget

| | Q1-02($M) | | | Q2-02($M) | | | Q3-02($M) | | | Q4-02($M) | | | TOTAL |
|---|---|---|---|---|---|---|---|---|---|---|---|---|---|
| | Jan | Feb | Mar | Apr | May | Jun | Jul | Aug | Sep | Oct | Nov | Dec | |
| Tier 1 Advertising | $8.16 | $6.98 | $10.07 | $9.34 | $10.27 | $11.52 | $8.01 | $8.82 | $0.00 | $9.04 | $9.95 | $11.15 | $105.31 |
| Tier 2 Advertising | $2.72 | $2.99 | $3.36 | $2.94 | $3.24 | $3.63 | $2.65 | $2.91 | $0.00 | $3.24 | $3.56 | $3.99 | $35.21 |
| Tier 3 Advertising | $4.34 | $4.77 | $5.35 | $3.82 | $4.21 | $4.72 | $3.24 | $3.56 | $0.00 | $4.78 | $5.26 | $5.89 | $49.93 |
| Direct Mkting | $0.81 | $0.89 | $1.00 | $1.18 | $1.29 | $1.45 | $1.03 | $1.13 | $1.27 | $1.03 | $1.13 | $1.27 | $13.48 |
| Promos/Events | $1.91 | $2.10 | $2.36 | $2.50 | $2.75 | $3.08 | $1.62 | $1.78 | $2.00 | $2.50 | $2.75 | $3.08 | $28.43 |
| Online | $0.81 | $0.89 | $1.00 | $1.03 | $1.13 | $1.27 | $0.81 | $0.89 | $1.00 | $1.10 | $1.21 | $1.36 | $12.50 |
| TOTAL | $18.75 | $20.62 | $0.00 | $20.81 | $22.89 | $25.66 | $17.35 | $19.09 | $4.26 | $21.69 | $23.86 | $26.75 | $244.86 |

Pricing

| | Jan | Feb | Mar | Apr | May | Jun | Jul | Aug | Sep | Oct | Nov | Dec | Aug |
|---|---|---|---|---|---|---|---|---|---|---|---|---|---|
| MSRP | 22,000 | 22,500 | 23,500 | 22,500 | 23,000 | 23,000 | 22,500 | 22,500 | 22,500 | 22,000 | 22,000 | 22,000 | 22,500 |

Incentives Offer 1

| | Jan | Feb | Mar | Apr | May | Jun | Jul | Aug | Sep | Oct | Nov | Dec |
|---|---|---|---|---|---|---|---|---|---|---|---|---|
| $1,500 Cash Back | N | N | N | N | N | Y | Y | Y | Y | N | N | N |

Apply Changes | Cancel

COMMON TASKS
- Format for Print
- E-Mail Page
- Revise Market Factors
- Simulate Outcome
- Copy a Scenario
- Copy a Plan
- Designate New POR

OTHER TASKS
- Browse Your Reports
- Browse Your Plans

CHANGE VIEWS
- Change Time Period
- Change Metric

ALERTS

MARKETING OPTIMIZATION SYSTEM

CROSS-REFERENCE TO RELATED APPLICATIONS

This application claims priority to U.S. provisional patent application Ser. No. 60/376,495, filed Apr. 30, 2002. The provisional application Ser. No. 60/376,495 is incorporated by reference herein.

FIELD OF THE INVENTION

The present invention relates generally to marketing and more particularly to a marketing optimization system and method for planning, analyzing, and optimizing aspects of marketing information, such as marketing investments.

BACKGROUND OF THE INVENTION

Companies of all sizes and specialties typically spend enormous amounts of money on marketing. These expenditures are often through many different channels, such as television advertisements, web advertisements, newspaper ads, etc. Associated with these marketing investments are the returns on these investments. Measuring a return on a marketing investment is typically extremely complex, due to the number of layers of options and data. For example, data can exist for each marketing product, channel, media, promotion, geographic scope, etc. The vast amount of data relating to a marketing expenditure does not, consequently, lend itself to analysis and optimization of a marketing investment.

Furthermore, to manage marketing investments, corporations typically create marketing plans. These plans are often spreadsheets. Plans of one department of the corporation, however, are commonly not accessible to other departments within the corporation. Additionally, a corporation may store their plans with a third party. Thus, the marketing plans are typically not centrally accessible, instead being dispersed through different departments within a corporation or at one (or more) third party. Therefore, the marketing of a corporation is often not well coordinated. This hampers the ability to monitor and track marketing investments and/or budgets versus actuals without much labor and manipulation.

Marketers also typically want to forecast future outcomes against specific business metrics to plan a corporation or department's supply chain, manage distribution channels, monitor the likelihood of meeting their goals throughout the course of plan cycles, and communicate financial projections to investors. Forecasts, however, are typically difficult to generate. For any given business, there are a large number of factors that influence the business outcome. Many companies generate forecasts through a manual process supported by documents (e.g., spreadsheets). This process can be burdensome and time-consuming, consequently making the improvement and updating of the forecast inputs unappealing and burdensome.

Thus, there is a need to organize, integrate, and analyze marketing metrics across marketing disciplines (e.g., a corporation's different product lines) to optimize marketing investments.

SUMMARY OF THE INVENTION

In one aspect, the invention relates to a marketing optimization module that automatically obtains multi-dimensional marketing data from a market client. The obtaining can be either extracting or receiving the data from the market client. This automatic extraction can occur when, for instance, the marketing data has changed, at a predetermined frequency, continuously, and the like. The marketing optimization module automatically organizes (e.g., formats) at least a part of the multi-dimensional marketing data into one or more marketing category. The marketing optimization module then analyzes all of or a part of the multidimensional marketing data to facilitate the optimization of a marketing investment.

In one embodiment, the organization step includes apportioning some or all of the multi-dimensional marketing data, assigning some or all of the multi-dimensional data, aligning the data in the marketing category, and/or integrating the data with data in the marketing category. The marketing category can be marketing goals, financial plans, technical plans, plans and programs, business results, market factors, and/or an audience and segment category. In one embodiment, the marketing optimization module links together one or more marketing categories.

The analysis step can include analyzing return on investment, analyzing effectiveness of a marketing strategy, forecasting business results, measuring a variance, simulating a response to a marketing strategy, and/or modeling a market. In another embodiment, the marketing optimization module creates an analysis path through the multi-dimensional marketing data.

In another aspect, the invention relates to a market server that includes a user interface, an input subsystem, and a marketing optimization module. The user interface communicates with a market client to automatically obtain multi-dimensional marketing data. The input subsystem communicates with the user interface to organize some or all of the multi-dimensional marketing data into a marketing category, and the marketing optimization module communicates with the input subsystem to automatically analyze the organized data to facilitate optimization of a marketing investment.

In one embodiment, the market server includes a marketing performance monitor, a marketing planner, a marketing simulator, and an analytics engine. The performance monitor monitors and/or reports one or more marketing metrics. In one embodiment, the marketing optimization module includes a marketing mix modeling analysis module, a key performance indicator module, a price elasticity module, and a trade promotion module. The marketing planner manages marketing plan information, such as by consolidating the multi-dimensional data with formatted data. Further, the marketing planner can include an operational planner to perform execution functions, tracking functions, and/or resource management for the market client. The marketing planner can also include a financial planner to plan budgets, estimates, and actuals for a market client. The marketing planner can also include a strategic planner that plans goals, objectives, and/or processes for the market client.

In one embodiment, the marketing simulator simulates a response to a marketing strategy. Further, the analytics engine analyzes the marketing data, such as by using a marketing model. In one embodiment, the multi-dimensional marketing data includes marketing plans, marketing data, business results, market factors, research data, product data, price data, promotion data, customer data, audience data, competitive data, marketing buys, operational data, and external data.

In yet another aspect, the invention relates to a method of analyzing marketing data including automatically obtaining multi-dimensional marketing data from a market client, performing statistical analysis on the multi-dimensional marketing data, reporting factual information on the data, and analyzing the marketing data using the statistical analysis and the factual information to produce a marketing result.

In one embodiment, the method also includes the step of modeling a market to generate the marketing result. The factual information can include a budget of a market client having an unspent portion and a spent portion. Additionally, in some embodiments, the modeling only uses an unspent portion of the budget. Furthermore, in some embodiments, the analysis step further comprises creating an analysis path through the marketing data.

The invention also relates to a method of integrating marketing data including the steps of automatically obtaining multi-dimensional marketing data from a market client and guiding a user of the market client in integrating some or all of the multi-dimensional marketing data with data in a marketing category.

In one embodiment, the method also includes analyzing the integrated data, such as across a plurality of dimensions of the multi-dimensional marketing data or across a plurality of categories. The analyzing step can include determining a return on investment. In one embodiment, the method includes organizing at least some of the multi-dimensional data into the marketing category.

In yet another aspect, the invention relates to a method of optimizing a marketing budget. The method includes the step of automatically obtaining marketing data from a market client. The marketing data includes a marketing budget and marketing activity data. The method also includes the step of automatically linking the marketing budget to the marketing activity data to optimize the marketing budget.

BRIEF DESCRIPTION OF THE DRAWINGS

In the drawings, like reference characters generally refer to the same parts throughout the different views. Also, the drawings are not necessarily to scale, emphasis instead generally being placed on illustrating the principles of the technology.

FIG. 10 is an embodiment of a formatting process to create formatted marketing information.

FIG. 13 is an embodiment of a screen shot of a network television advertising plan.

FIG. 21 is an embodiment of a screen shot of a simulation of an alternative plan from FIG. 12.

DETAILED DESCRIPTION

Figure 1:
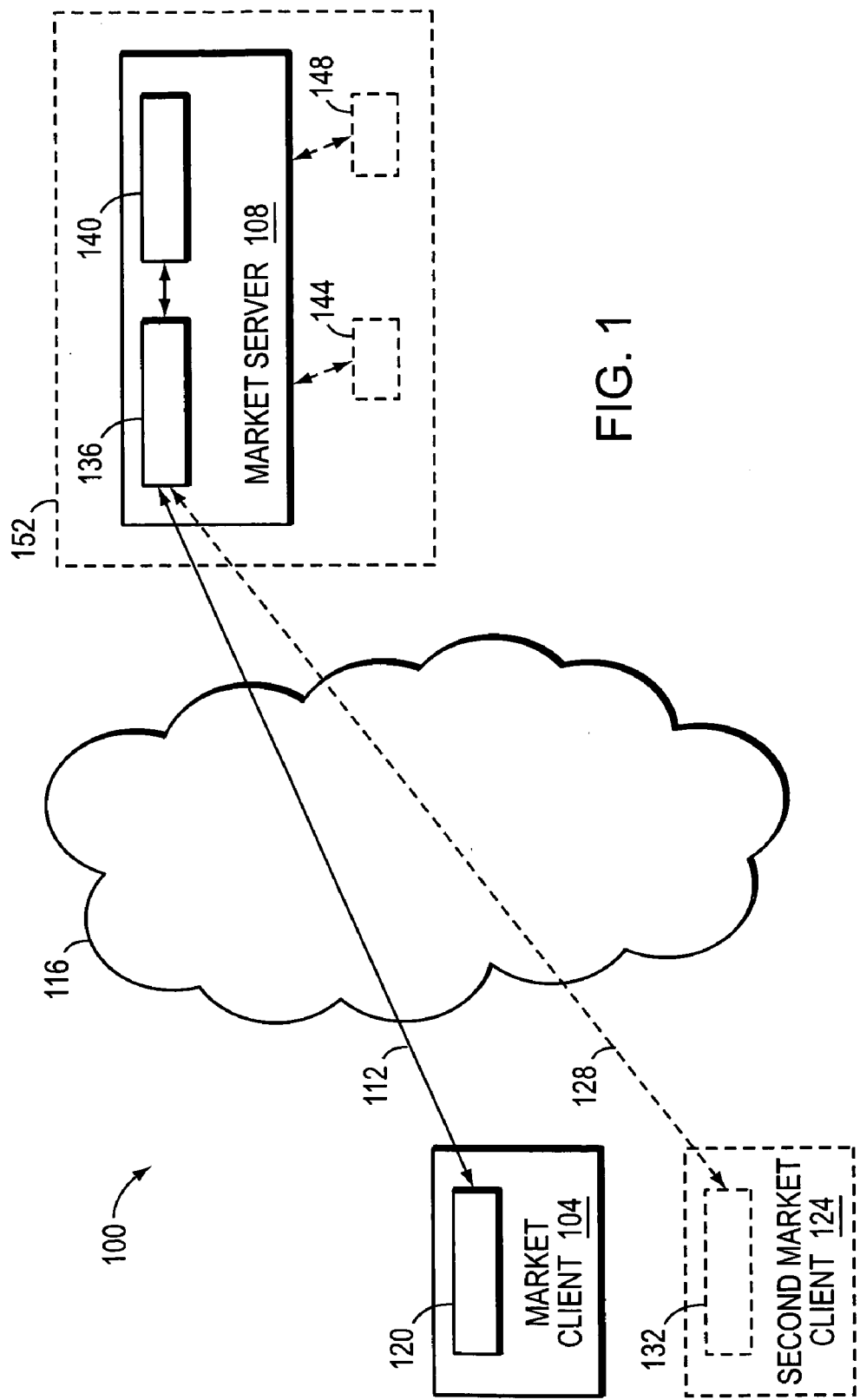
FIG. 1 is a block diagram of an embodiment of a market optimization system.

Referring to FIG. 1, a market optimization system 100 includes a market client computer (or market client) 104 and a market server computer (or market server) 108. The market client 104 communicates with the market server 108 over a market communications path 112 and a market communications network 116. It should be noted that FIG. 1 is an exemplary embodiment intended only to illustrate, and not limit, the subject technology.

In one embodiment, the market client 104 can be a personal computer (e.g., 286, 386, 486, Pentium, Pentium II, Macintosh computer), Windows-based terminal, network computer, wireless device, information appliance, RISC Power PC, X-device, workstation, mini computer, main frame computer, personal digital assistant, or other computing device that can connect to a network. Windows-oriented platforms supported by the market client 104 can include, without limitation, WINDOWS 3.x, WINDOWS 95, WINDOWS 98, WINDOWS NT 3.51, WINDOWS NT 4.0, WINDOWS 2000, WINDOWS CE, WINDOWS XP, MAC/OS, Java, and UNIX. The market client 104 can include a visual display device (e.g., a computer monitor), a data entry device (e.g., a keyboard), persistent or volatile storage (e.g., computer memory) for storing downloaded application programs, a processor, and a mouse.

Although described above and below as a client computer, the market client 104 can be any source or recipient of data. As described in more detail below with respect to FIG. 4, the market client 104 (also referred to below as a data source) communicates data to the market server 108 over the market communications network 116. The market client 104 also includes a user interface 120. The interface 120 can be text driven (e.g., DOS) or graphically driven (e.g., Windows). In one embodiment, the market client user interface 120 is a web browser, such as INTERNET EXPLORER developed by Microsoft Corporation (Redmond, Wash.), connected to the market communications network 116. In a further embodiment, the web browser 120 uses the existing Secure Socket Layer (SSL) support developed by Netscape Corporation (Mountain View, Calif.), to establish the market communications network 116 as a secure network.

In yet another embodiment, a second market client 124 communicates with the market server 108 over a second market communications path 128. The second market client 124 may include the same components as the market client 104, such as having a user interface 132. Further, the second market communications path 128 may be equivalent to the market communications path 112. Alternatively, the second market communications 128 may have different characteristics (e.g., different transmission data rate) than the market communications path 112. In another embodiment, the second market communications path 128 passes through a different network than the communication network 116. In yet another embodiment, the second market client 124 communicates over the same communications path 112 as the market client 120. Additionally, although the market optimization system 100 is illustrated in FIG. 1 with two market clients 104, 124 and described below in terms of the market client 104, the market optimization system 100 supports any number of market clients.

The market communications network 116 can be a local-area network (LAN), a medium-area network (MAN), or a wide area network (WAN) such as the Internet or the World Wide Web (i.e., web). In one embodiment, the market communications network 116 (i.e., the market communications path 112) supports secure market communications. In a further embodiment, market communications occur after the market server 108 verifies a market client user's password. Exemplary embodiments of the market communications path 112 include standard telephone lines, LAN or WAN links (e.g., T1, T3, 56 kb, X.25), broadband connections (ISDN, Frame Relay, ATM), and wireless connections. The connections over the market communications path 112 can be established using a variety of market communication protocols (e.g., TCP/IP, IPX, SPX, NetBIOS, Ethernet, RS232, and direct asynchronous connections).

The market server 108 can be any personal computer described above. In one embodiment, the market server 108 hosts one or more applications 136 that the market client 104 can access over the market communications network 116. In one embodiment, the application 136 is a user interface that displays an output of the market server 108. The application 136 can be, for example, a graphical user interface, tabular illustration, plot, spreadsheet program, word processing program, etc.

Further, as described in more detail below with respect to FIG. 2A, the market server 108 additionally includes a marketing optimization module 140 to perform functions based on marketing data obtained from the market client 104. Additionally, although illustrated in FIG. 1 as modules within the market server 108, the marketing optimization module 140 and/or the applications 136 may instead be externally located from and in communication with the market server 108.

In another embodiment, the market server 108 is a member of a server farm, which is a logical group of one or more servers that are administered as a single entity. In the embodiment shown, the server farm 152 includes the market server 108, a second market server 144, and a third market server 148.

In one embodiment, the marketing optimization module 140 automatically (e.g., continuously, periodically) measures the effectiveness of a client user's marketing investments (e.g., over many marketing channels/investments). Examples of the user of the market client 104 include a company, a customer of the market server 108, a supplier, a distributor, a retailer, a media buyer, and a market analyst. Moreover, the user of the market client 104 may be referred to below as a customer and/or a company. In some embodiments, the marketing optimization module 140 analyzes the company's (e.g., client user's) marketing investments to improve the performance of the investments. The marketing optimization module 140 performs these functions by accessing integrated marketing data. In additional embodiments, the marketing optimization module 140 automatically performs marketing functions by, for example, automatically collecting marketing data.

Figure 2A:
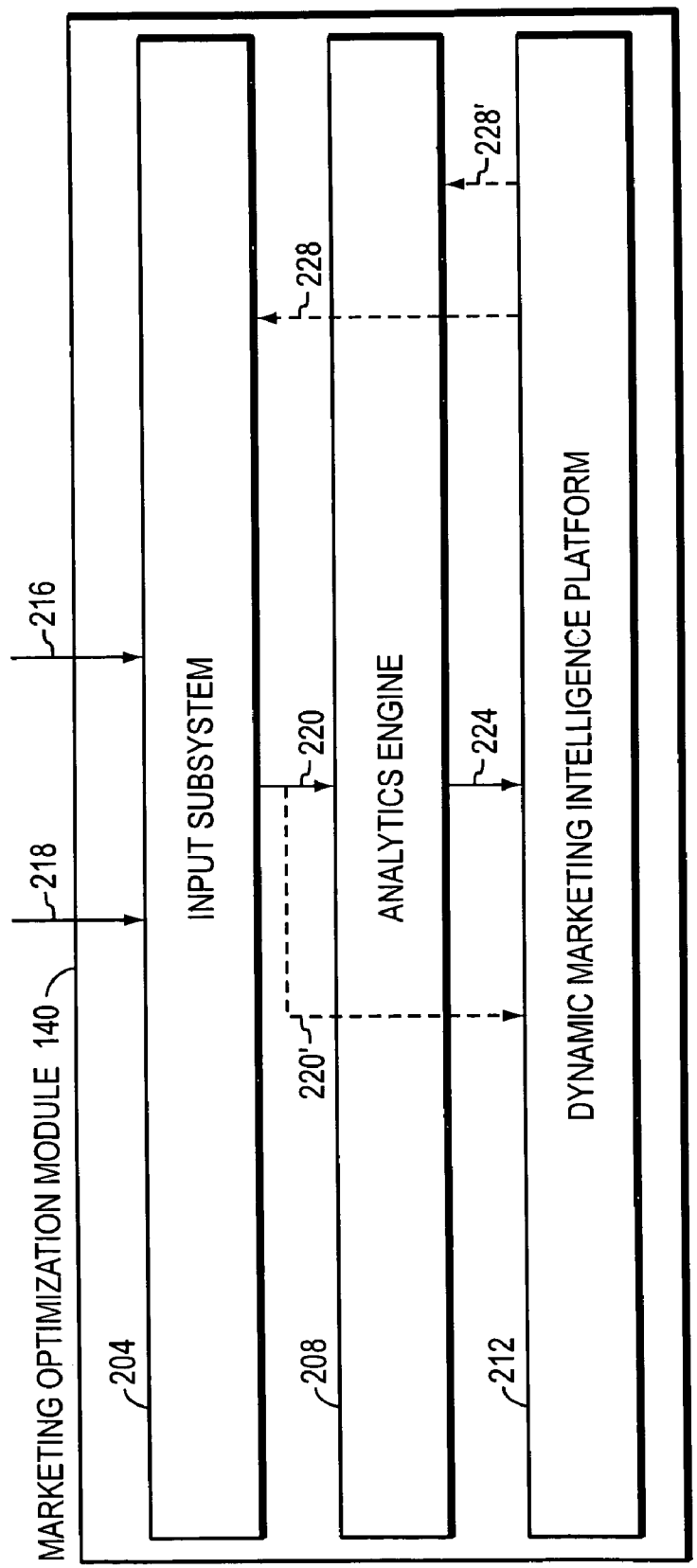
FIG. 2A is a block diagram of an embodiment of a marketing optimization module of the market optimization system of FIG. 1.

Referring to FIG. 2A, the marketing optimization module 140 includes an input subsystem 204, an analytics engine 208, and a dynamic marketing intelligence platform 212. In one embodiment, these components 204-212 are software modules (e.g., software components) executing within the marketing optimization module 140. In another embodiment, one or more of these modules 204-212 are externally located from the marketing optimization module 140 and communicate with the marketing optimization module 140. In yet another embodiment, one or more of these modules 204-212 are externally located from the market server 108.

The marketing optimization module 140 uses these components 204-212 to perform functions on multi-dimensional marketing data 216. In one embodiment, the marketing optimization module 140 obtains multi-dimensional marketing data 216 from the market client 104. The obtaining of the data 216 can be receiving the data 216 from the client 104 or extracting the data 216 from the client 104. Thus, the marketing data 216 can be pushed to the market server 108 or pulled by the market server 108. Although described below as receiving marketing data 216 from the market client 104, the marketing data 216 can be received from any number of market clients.

Examples of the functions that the marketing optimization module 140 performs include organizing the multi-dimensional marketing data 216 into marketing categories, continuously and/or automatically quantifying the impact of all marketing programs, providing automated analytics to determine the success of a marketing approach, evaluating the opportunities and risks of an action to maximize results of a user of a market client 104, enabling dynamic marketing planning, etc. The marketing optimization module 140 automatically captures, integrates, and organizes the marketing data 216. In one embodiment, this automatic capture, integration, and organization occurs continuously or periodically. For example, the marketing optimization module 140 seeks and/or obtains existing, new and/or updated marketing data 216. In one embodiment, the marketing optimization module 140 standardizes metrics across marketing disciplines.

Additionally, the marketing optimization module 140 can determine market effectiveness, perform marketing scenario simulations, make corrections to any input (e.g., marketing strategy) or process to, for example, improve a marketing strategy's performance or respond to unanticipated factors (e.g., competition, economy changes, and catastrophes).

As described in more detail below, the multi-dimensional marketing data 216 includes, for instance, marketing data, operational data, and external data. In particular, the marketing optimization module 140 automatically (e.g., when new or updated data is available) captures, integrates, and organizes advertising metrics for a company. Advertising metrics can include, for example, impressions, click-through rate (CTR), conversion rate, cost-per-action (CPA), cost-per-click (CPC), cost per thousand impressions (CPM), customer acquisition costs, pay per click (PPC), pay per lead (PPL), pay per sale (PPS), etc.

Further examples of the multi-dimensional marketing data 216 include an on-line marketing strategy (e.g., information relating to a company's on-line advertising), a marketing strategy that is television-based (e.g., information relating to money spent for advertising in movies, television commercials, video cassette recorder (VCR) tapes, and digital versatile discs (DVDs)), information relating to physical advertisements (e.g., billboards, flyers, newspaper or magazine ads, signs) or any combination of the above-mentioned marketing techniques. Moreover, the marketing data 216 can also include financial returns from customers. The financial returns can include returns from advertising, public relations, the impact of the sales force, and distribution channels.

In one embodiment, the marketing optimization module 140 obtains disparate multidimensional marketing data 216, resident in multiple systems and files, and located across several marketing clients 104. In one embodiment, the marketing optimization module 140 organizes the marketing data 216 into categories and then integrates the obtained marketing data 216 into a data repository.

In one embodiment, the input subsystem 204 is a software module providing a company (e.g., operating the market client 104 or operating the server 108) with a user interface to analyze their market strategy. The input subsystem 204 can provide one or more options to the company, such as simulating the market in response to various inputs and reporting the results of the simulation. In one embodiment, the input subsystem 204 accepts marketing input 218 from one or more market clients 104, such as instructions on how to analyze marketing data 216 or a market strategy of the market client user. In another embodiment, an operator of the market server 108 provides the marketing input 218 to the input subsystem 204. In further embodiments, the input subsystem 204 organizes and/or formats the marketing data 216 in response to the marketing input 218. For instance, the input subsystem 204 can integrate the marketing input 218 with the marketing data 216 before and/or during analysis.

The input subsystem 204 then transmits formatted marketing information 220 to the analytics engine 208. In one embodiment, the input subsystem 204 (and/or the dynamic marketing intelligence platform 212) transforms the multi-dimensional marketing data 216 into discrete marketing categories. In one embodiment, the input subsystem 204 continuously transmits formatted marketing information 220 to the analytics engine 208. The analytics engine 208 receives the formatted marketing information 220 and uses one or more algorithms to analyze the information 220. In one embodiment, the analytics engine 208 analyzes the formatted marketing information 220 by executing models, generating forecasts, and/or calculating variances on the formatted marketing information 220.

In particular, the analytics engine 208 receives the formatted marketing information 220 and analyzes the information 220 to improve marketing performance of the company. In one embodiment, the analytics engine 208 analyzes the marketing information 220 to reduce the company's marketing budget. In another embodiment, the analytics engine 208 focuses on producing a marketing strategy for the company that ensures the direct causal relationship between marketing dollars spent on marketing and tangible business results. This analysis may include the recommendation of a marketing medium in which to focus marketing dollars, such as focusing marketing dollars in cable television, trade promotions, on the Internet, movie theaters, on-line games pricing, and/or other marketing activities.

In further embodiments, the analytics engine 208 separates short-term returns from long-term returns for a more-detailed analysis of the formatted marketing information 220. Moreover, the analytics engine 208 can determine the value of the company's brand.

In one embodiment, the analytics engine 208 transmits analyzed marketing information 224 to the marketing intelligence platform 212 for storage, integration, and/or organization. In another embodiment, the input subsystem 204 transmits a copy of the formatted marketing information 220' to the marketing intelligence platform 212 for storage, integration, and/or organization before and/or during analysis by the analytics engine 208.

In one embodiment, the marketing intelligence platform 212 is a data repository that organizes and integrates marketing information. The marketing intelligence platform 212 can include a persistent storage, such as a multi-tiered (i.e., a multi-dimensional) database. The database can be organized based on a client's marketing strategy and/or a client's organization. In some embodiments, the input subsystem 204 retrieves organized marketing information 228 from the marketing intelligence platform 212. In further embodiments, the analytics engine 208 retrieves organized marketing information 228' from the marketing intelligence platform 212.

Figure 2B:
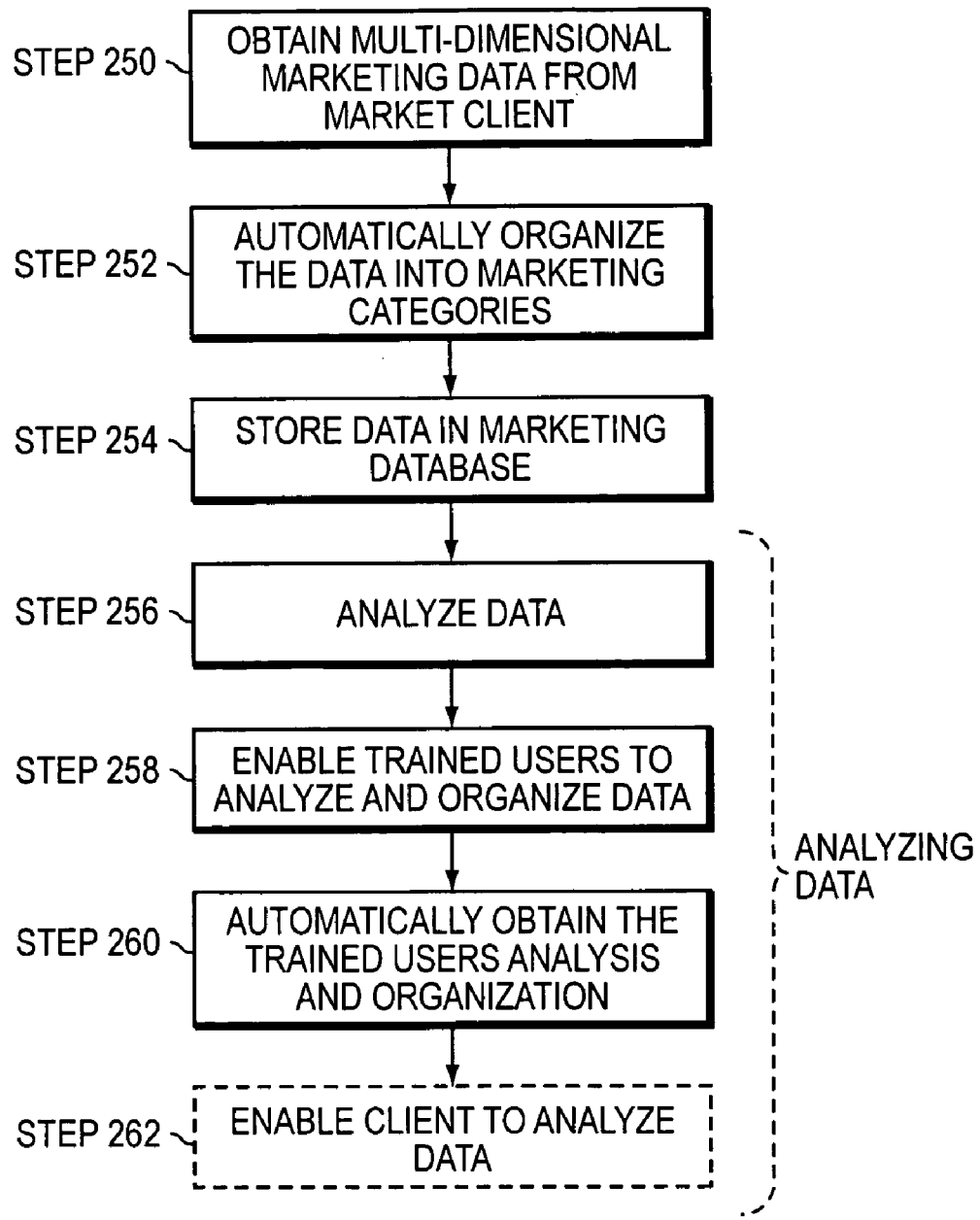
FIG. 2B is a flow chart illustrating an embodiment of the steps performed by the market optimization system of FIG. 1.

FIG. 2B provides a high level illustration of an embodiment of the steps performed by the marketing optimization module 140 to optimize market spending of a market client 104. The marketing optimization module 140 automatically (e.g., continuously, periodically) obtains the multi-dimensional marketing data 216 from the market client 104 (step 250). In one embodiment, the market server 108 continuously obtains the marketing data 216 from the market client 104. The marketing data 216 includes a marketing budget and marketing activity data of the market client 104. The marketing activity data can include, for instance, the types of marketing events or activities that the market client 104 spent money on The marketing optimization module (e.g., the guided analysis module 958) then automatically links the marketing budget to the marketing activity data. In one embodiment, the linking optimizes the marketing budget by enabling the market client 104 to analyze the return on its marketing investments.

The marketing optimization module 140 automatically organizes the data 216 into discrete marketing categories (step 252). Organization can include, for instance, processing the data 216 and/or transforming the data 216 (e.g., formatting the data 216). The marketing optimization module 140 stores the data 216 in the dynamic marketing intelligence platform 212 (i.e., a multi-tiered marketing database) (step 254). The organization of the multi-dimensional marketing data 216 into marketing categories can include the storing of the formatted data 220 into the dynamic marketing intelligence platform 212. In one embodiment, the marketing optimization module 140 then analyzes the formatted data 220 (step 256). Further, the marketing optimization module 140 then enables trained users, such as users of the market server 108, to analyze and/or organize the formatted data 220 to facilitate optimization of marketing investments (step 258). In one embodiment, the users of the market server 108 make one or more judgments on the formatted data 220 (or multi-dimensional marketing data 216) to facilitate the optimization of the marketing investments. The marketing optimization module 140 then automatically obtains the trained users' analysis and organization (step 260). The marketing optimization module 140 then enables the market client 104 to analyze the formatted data 220. In some embodiments, the market client 104 can analyze the formatted data 220 (and/or the multi-dimensional marketing data 216) at any time. In one embodiment, steps 256-262 are referred to as the marketing optimization module's analysis of the formatted data 220 (and/or multi-dimensional marketing data 216).

Figure 2C:
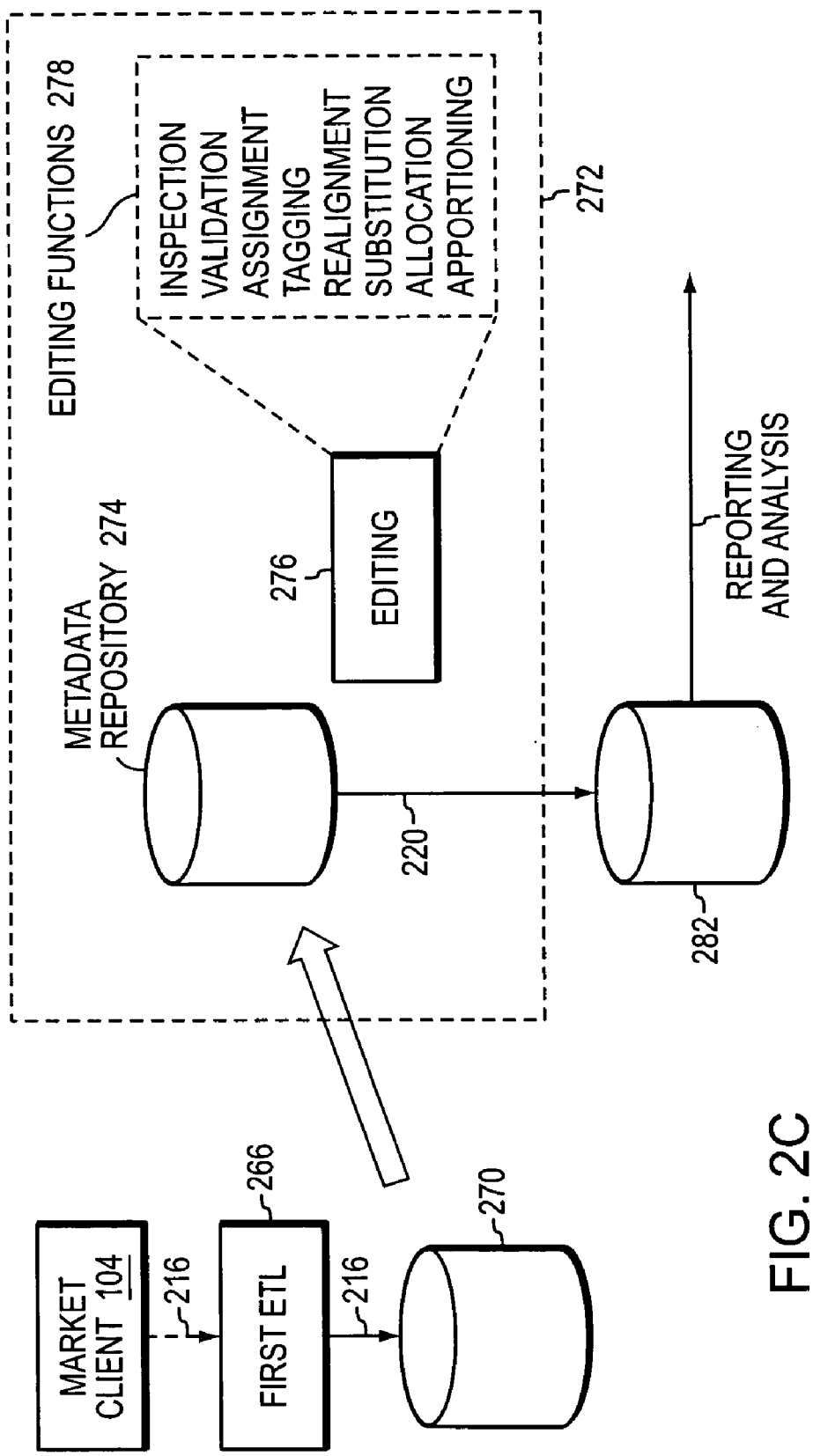
FIG. 2C is a block diagram of an embodiment of a dynamic marketing intelligence platform located in the marketing optimization module of FIG. 2A.

Referring to FIG. 2C, an embodiment of the input subsystem 204 and the dynamic marketing intelligence platform 212 includes extraction-transformation-loading (ETL) tools to organize and facilitate editing of the marketing data 216. ETL tools enable, for example, the identification of relevant information obtained from the market client 104, the extraction of this information, the customization and integration of the information into a common format, the cleaning of the resulting formatted data (e.g., based on a set of rules), and the propagation of the data to a database.

In particular, the marketing intelligence platform 212 includes a first ETL 266 that extracts the marketing data 216 from one or more market clients 104. In one embodiment, the extraction occurs by extraction routines, which provide either complete snapshots or differentials of a data source of the market client 104. The marketing data 216 is then stored in a data warehouse 270 and propagated to a data staging area 272. The data staging area 272 includes a metadata repository 274. The metadata repository 274 includes metadata that enables transformation of and cleaning of the marketing data 216. The metadata repository 274 can include data and transformation rules to define, for example, how the marketing data 216 is transformed into the formatted data 220. In one embodiment, the first ETL 266 generates the metadata repository 274. In one embodiment, the transformation of the data 216 forms the formatted marketing data 220 and is the classifying of the marketing data 216 into one or more marketing categories. This categorization facilitates, for instance, analysis of the marketing data.

The marketing optimization module 140 automatically obtains the marketing data 216 from a market client 104. To facilitate the automatic obtaining of additional marketing data 216, in one embodiment the metadata repository 274 generates and maintains states for the marketing data 216. In one embodiment, the metadata repository 274 (or the first ETL 266) maintains one or more rules regarding the frequency of the obtaining of the marketing data 216. For example, the first ETL 266 can continuously extract the marketing data 216 from the market client 104. Alternatively, the first ETL 266 may extract the data 216 periodically, and/or the extraction may be based on an external triggering event such as receiving a message or data from the market client 104.

As stated above, the marketing optimization module 140 organizes multi-dimensional marketing data 216 into one or more marketing categories. In one embodiment, as part of the organization, the marketing optimization module 140 enables a user of the market client 104 to edit the marketing data 216. Alternatively, the marketing optimization module 140 edits the marketing data 216. In either case, the editing 276 occurs via editing functions 278 of the metadata repository 274. The editing (i.e., formatting or organizing) can include, for example, inspecting the data 216, validating the data 216, assigning the data 216 to a marketing category, tagging the data 216, realigning the data 216 with preexisting data in a marketing category, substituting data in a marketing category with updated data 216, allocating the data 216 to a marketing category, and/or apportioning the data 216 to a marketing category. Once the data 216 is edited, the formatted data 220 is stored in a multi-tiered database 280 for analysis and/or reporting. In one embodiment, the database 280 is the dynamic marketing intelligence platform 212. In other embodiments, the dynamic marketing intelligence platform 212 includes all of the components shown in FIG. 2C.

Figure 3:
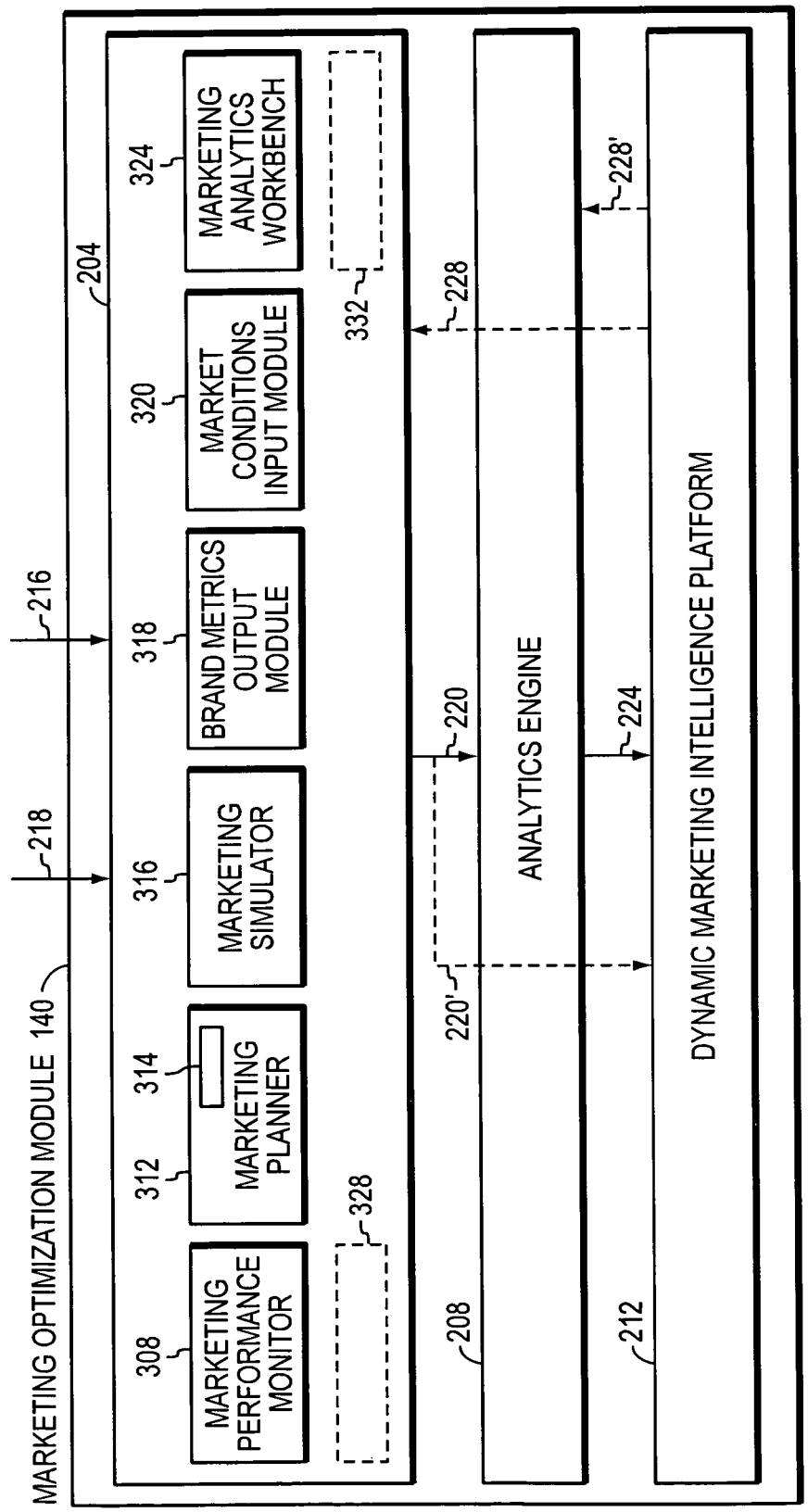
FIG. 3 is a block diagram of an embodiment of an input subsystem located in the marketing optimization module of FIG. 2A.

Referring to FIG. 3, in one embodiment the input subsystem 204 of the marketing optimization module 140 includes a marketing performance monitor 308, a marketing planner 312, a marketing simulator 316, a brand metrics output module 318, a market conditions input subsystem 320, and a marketing analytics workbench 324. Although described below as individual software modules, one or more of the modules 308-324 can be combined into one (or more) modules. For example, the functions performed by the marketing planner 312 can be incorporated into the marketing simulator 316.

In one embodiment, the marketing performance monitor 308 monitors and reports a company's marketing choices (e.g., marketing investments). This analysis may focus on, for instance, the effectiveness of the investment, the efficiency of the investment, and the value of the investment in light of the company's goals. In some embodiments, the marketing performance monitor 308 proactively monitors the profit and loss impact of marketing investments across all channels, media, and market segments for market client users. The marketing performance monitor 308 monitors and reports one or more metrics requested by a market client user and/or metrics determined by the marketing optimization module 140. In one embodiment, the marketing performance monitor 308 produces a report of a marketing client user's profits and losses. Other examples of metrics include, but are not limited to, revenue, profit, leads, new customers, time, sales, number of prospects, number of new accounts, contribution of one or more marketing factors, advertising metrics described above (e.g., impressions), etc. The report can include information from previous actions, forecasted information, or both.

In one embodiment, the marketing optimization module 140 forecasts information for the report by, for example, using data previously collected (e.g., data from one year ago), the state of the market as a whole, and the state of a subset of the market that is relevant to the market client 104. Additionally, the marketing performance monitor 308 can include one or more event milestones of a company in the report.

The marketing performance monitor 308 can also transmit the report information to one or more of the other components (e.g., components 208-212, 312-324). Additionally, the marketing performance monitor 308 can transmit the report to the market client 104. The report can be of any format, such as a graph, flow chart, plot, table, etc. Additionally, the report can track specific metrics over a specific time frame (e.g., a trend report) or can compare specified metrics for a specific time frame (e.g., a comparison report). In one embodiment, a user of the market client 104 inputs a time frame to the market server 108. Alternatively, the marketing optimization module 140 can determine a time period in which to report information. Example reports include a results trend, a results comparison, a marketing mix impact trend, a marketing mix impact comparison, a variance trend, a variance comparison, etc.

In yet another embodiment, the marketing performance monitor 308 plots the cost per impression of each marketing mix type over time. In some embodiments, the marketing performance monitor 308 plots event milestones. For example, a particular project may have one major event for each month of the project's development. The performance monitor 308 can plot an event milestone for each major event and whether the event was completed.

The marketing planner 312 is a module enabling the updating and/or entry of marketing plan and buy information. In one embodiment, the marketing planner 312 aligns the marketing data 216 with a specific date at a periodic frequency (e.g., days, weeks, months, or years). Alternatively, the marketing planner 312 averages the marketing data over a particular period (e.g., days, weeks, months, or years). In yet another embodiment, the marketing planner 312 applies a curve to the data 216 spread over the period (e.g., days, weeks, months, or years).

Additionally, the marketing planner 312 consolidates and manages marketing planning information. In further embodiments, the marketing planner 312 coordinates internal and external resources. For example, a marketing organization's internal media planning group may use external media buying agencies to purchase commercial air time on network television or advertisements in national magazines.

For example, the marketing planner 312 uses the input 218 received from the business organization (e.g., operating the market client 104) to plan a marketing strategy (as well as a buying strategy (e.g., for goods, marketing expenditures) for the business organization. In some embodiments, the marketing planner 312 includes a marketing planner user interface 314 to enable the business organization to input their marketing and/or business information.

The marketing simulator 316 can simulate a market's response to a particular market strategy. More specifically, the marketing simulator 316 simulates different marketing mix scenarios and/or market assumptions (e.g., marketing plans or strategies across different marketing channels) to evaluate one or more marketing plans. For example, the marketing simulator 316 accepts one or more marketing inputs 218 about a current marketing plan and simulates the market with the current plan to forecast future market behavior with the current plan. Moreover, in some embodiments, the marketing simulator 316 focuses on particular characteristics of the market, such as the forecasted demand and supply of the company's product with the current marketing strategy, a previous market strategy, return on investment for a particular marketing investment, stock market values, bond market values, overseas markets, and the like.

In further embodiments, the marketing simulator 316 executes a forecast on an alternative plan to a particular company's current marketing strategy and simulates the market with the alternative plan. In another embodiment, the marketing simulator 316 simulates multiple markets with one or more plans, such as when a company is involved in several markets and/or is considering entering into another market.

The brand metrics output module 318 is a software module that provides a user interface for inputting, outputting, and/or maintaining brand tracking data. In one embodiment, the brand tracking data includes one or more brands that a company offers or is considering to offer with one or more of their products or services. In some embodiments, the brand tracking data is the added value endowed by the brand to a product or service (e.g., brand equity). Further, a company operating the market client 104 may estimate, propose, or measure the brand tracking data.

The market conditions input module 320 is a software module that provides a user interface for inputting and maintaining market conditions data (e.g., as part of the marketing data 216). Market conditions data includes, for example, the number of competitors in the particular market, the barrier entries, the cost of one or more products (e.g., a company's product(s) or the product(s) of one or more competitors). Further, a company operating the market client 104 may estimate, propose, or measure the market conditions data.

The market analytics workbench 324 is a software module that defines one or more models of the marketing data 216 (and/or marketing input 218). In one embodiment, the market analytics workbench 324 focuses the model(s) around economic principles and data. The market analytics workbench 324 may also update the model(s), such as after a change or modification of one or more inputs affecting the model.

In another embodiment, the input subsystem 204 includes a trade promotion module 328. The trade promotion module 328 promotes business transactions, trade shows, advertises trade shows, and the like. Further, the trade promotion module 328 may schedule these events.

In yet another embodiment, the input subsystem 204 includes a price optimization module 332. In one embodiment, the price optimization module 332 determines the optimal price for a particular product. The price optimization module 332 may determine this price based on the market, internal data, and the like.

Figure 4:
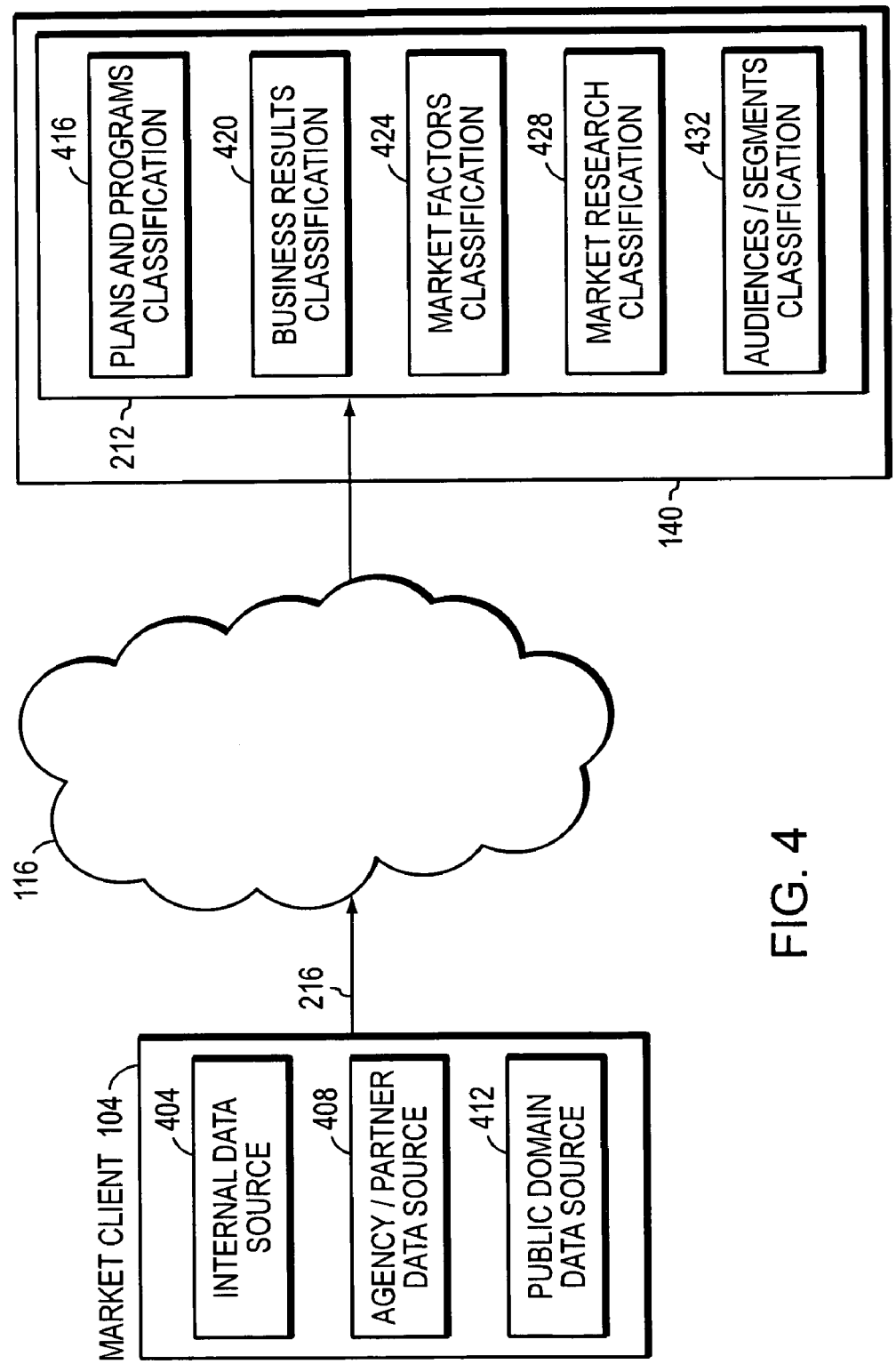
FIG. 4 is a block diagram of an embodiment of the marketing optimization module of FIG. 2A obtaining marketing data from data sources in a market client.

Referring to FIG. 4, in one embodiment the market client 104 includes an internal data source 404, an agency/partner data source 408, and a public domain data source 412. In one embodiment, the above-mentioned data sources 404, 408, 412 are software modules located within the market client 104. Alternatively, one or more of the data sources 404, 408, 412 are located on independent market clients 104.

In one embodiment, the internal data source 404 is a data source internal to a company's operations. Examples of the internal data source 404 include a Customer Relationship Management (CRM) system, an Enterprise Resource Planning (ERP) financial system, a media planning system, a spreadsheet (e.g., an EXCEL spreadsheet, developed by Microsoft Corporation of Redmond, Wash.), and a data entry system.

The agency/partner data source 408 is a data source from a customer's partner or agent. For example, a company may have a business relationship with another company. Therefore, to analyze a company's marketing expenditures and/or strategy accurately, the company may provide the marketing information from their partner to the marketing server 108. Examples of the agency/partner data source 408 include a media buying system, a media planning system, a research company spreadsheet, a research company database, etc.

In one embodiment, the public domain data source 412 is a data source that is available to the public. For example, the public domain data source 412 may be a syndicated data source (e.g., weather data from a public domain weather Web Site), a data source on the Internet, etc. In another embodiment, the data source is a syndicated data source offered for a fee (e.g., data from an audit of a retail store).

In one embodiment, one or more of the data sources 404, 408, 412 generate and/or transmit the marketing data 216 to the dynamic marketing intelligence platform 212. In another embodiment, the market client 104 transmits marketing data 216 to the marketing optimization module 140, and the optimization module 140 transmits the data 216 to the dynamic marketing intelligence platform 212. The dynamic marketing intelligence platform 212 may then organize the marketing data 216 into categories, or classifications. The categories can include a plans and programs classification 416, a business results classification 420, a market factors classification 424, a market research classification 428, and an audiences/segments classification 432. In one embodiment, the plans and programs classification 416 includes financial plans and technical plans. Further, the business results classification can include marketing goals. In another embodiment, the categories are limited to the marketing goals, financial plans, and technical plans.

Figure 5:
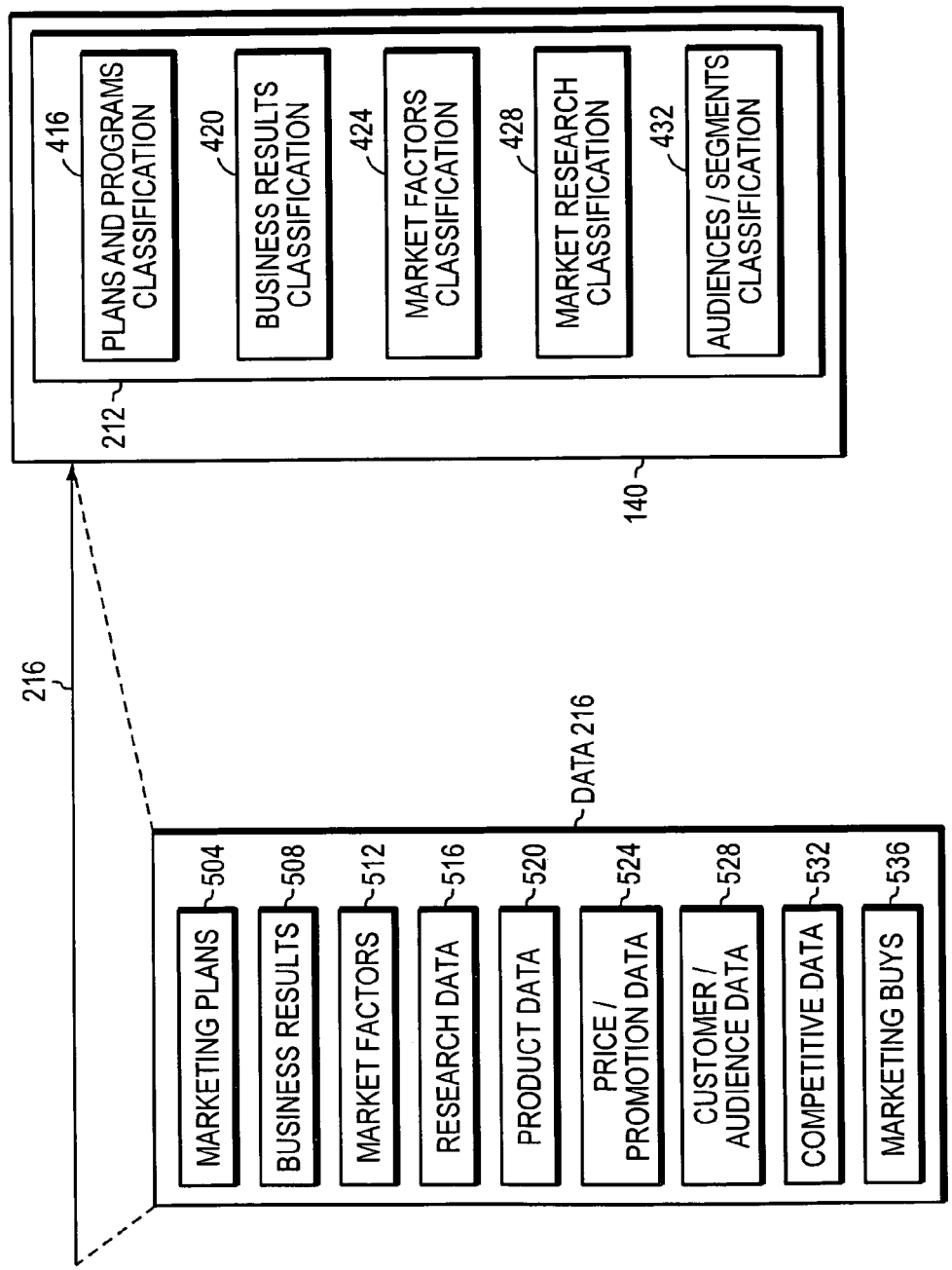
FIG. 5 is a more detailed block diagram of an embodiment of the marketing data of FIG. 4.

Referring to FIG. 5, in one embodiment, the multi-dimensional marketing data 216 includes information relating to marketing plans 504. The marketing plans 504 may relate to a company's current or future business plans and programs. The dynamic marketing intelligence platform 212 organizes this portion of the marketing data 216 into the plans and programs classification 416.

The marketing data 216 can also include information relating to business results 508. The business results 508 can include information relating to results of the current business strategy employed by the company, such as sales data for a particular business quarter, dollars spent on advertisement, return on investment (ROI) information, profits and losses experienced by the company, information on one or more products, etc. The dynamic marketing intelligence platform 212 organizes this portion of the marketing data 216 into the business results classification 420.

The marketing data 216 can also include information relating to market factors 512. The market factors 512 can include information relating to the number of competitors in a particular market, the supply and demand of the company's product(s) and/or service(s), the geographic location of the market, etc. The dynamic marketing intelligence platform 212 organizes this portion of the marketing data 216 into the market factors classification 424.

Additionally, the marketing data 216 can also include information relating to research data 516. The research data 516 can include information relating to information that the company has found through research (e.g., of the company or on the Internet), competitors of the company, the market, etc. The dynamic marketing intelligence platform 212 organizes this portion of the marketing data 216 into the market research classification 428.

The marketing data 216 can also include information relating to product data 520 and/or price/promotion data 524. The product data 520 and/or price/promotion data 524 can include information relating to sales information of the product, profits and/or losses associated with the product, demand and/or supply of the product, units produced, advertising dollars spent advertising the product, the advertising means used to advertise the product, etc. In one embodiment, the dynamic marketing intelligence platform 212 organizes one or more of these portions of the marketing data 216 into the business results classification 420. In another embodiment, the dynamic marketing intelligence platform 212 organizes one or more of these portions of the marketing data 216 into the market factors classification 424.

The marketing data 216 can also include information relating to customer/audience data 528, competitive data 532, and/or marketing buys 536. The customer/audience data 528 can include information relating to one or more customers of the company and one or more potential customers of the company. The competitive data 532 can include information relating to competitors of the company and/or sales of competing products. The marketing buys 536 can include information relating to how many sales of a particular product were directly related to a particular form of advertising.

In some embodiments, the previously described components 504-536 of the marketing data 216 are obtained via one or more surveys. Additionally, although a particular organization is described above for a particular component 504-536 of the marketing data 216, the dynamic marketing intelligence platform 212 can organize any portion of the marketing data 216 into any classification 416-432.

Moreover, in some embodiments the dynamic marketing intelligence platform 212 automatically classifies the marketing data 216 into one or more categories or classifications 416-432 upon receipt of the marketing data 216. Moreover, the categories 416-432 may be altered, updated, added to, or deleted by the marketing input 218. In yet another embodiment, the dynamic marketing intelligence platform 212 (or the marketing optimization module 140) dynamically adjusts the classifications (and/or number of classifications) in which the marketing data 216 is classified. For example, in one embodiment the dynamic marketing intelligence platform 212 dynamically adds another classification when the dynamic marketing intelligence platform 212 obtains a part of the marketing data 216 that does not fit well into the existing classifications.

Figure 6A:
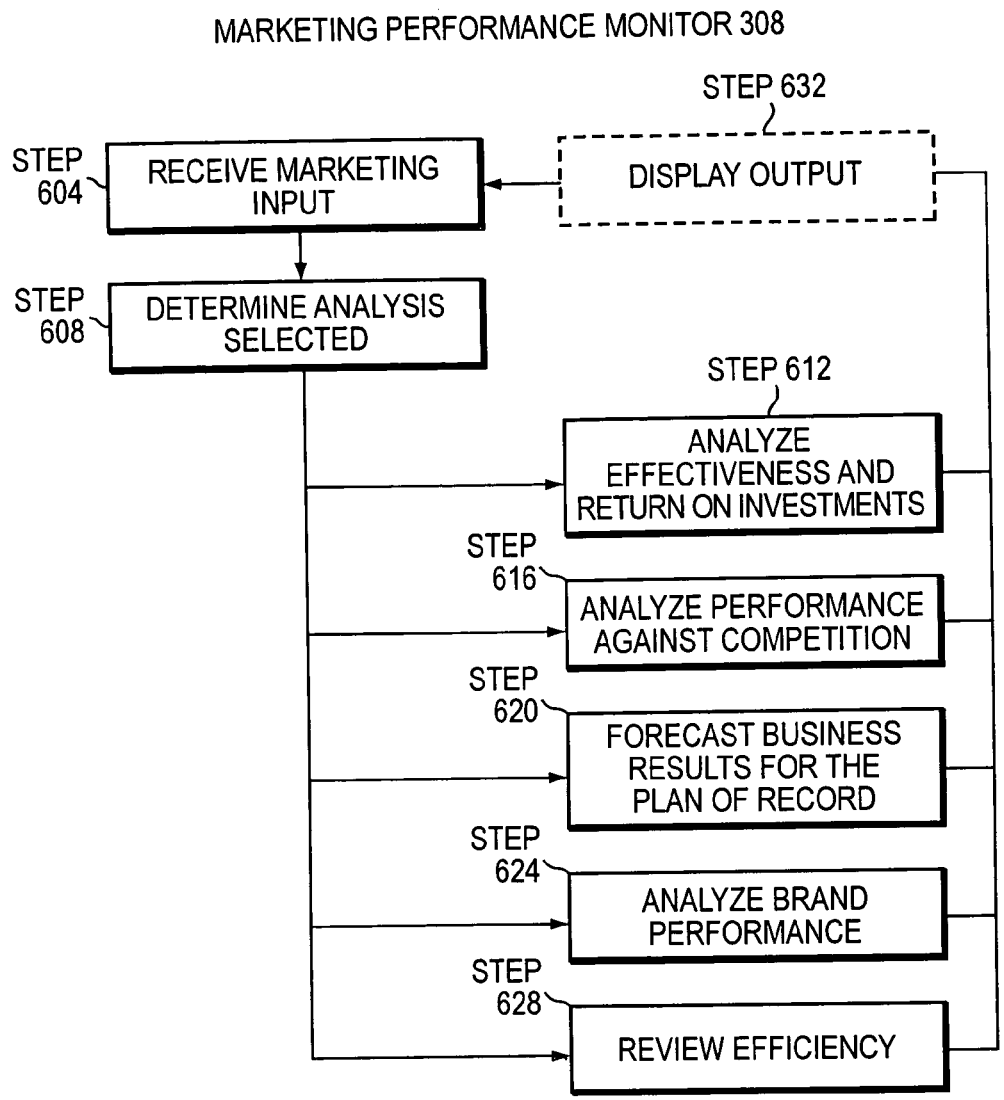
FIG. 6A is a flow chart illustrating an embodiment of the steps performed by a marketing performance monitor.

Referring to FIG. 6A, the performance monitor 308 receives the marketing input 218 (STEP 604) and determines the analysis selected by the market client 104 (STEP 608). In additional embodiments, the performance monitor 308 also obtains (e.g., continuously) the marketing data 216. The types of analysis that the performance monitor 308 can provide include analyzing the effectiveness of a customer's investments (e.g., effectiveness of advertising dollars spent in a particular advertising medium such as on-line advertising) and a customer's ROI (STEP 612), analyzing the performance of a customer's investments and/or market strategy against competition, forecast business records for a plan of record (STEP 620), which is a top-level plan against which the marketing optimization module 140 reporting and analysis will be performed on, analyze brand performance (STEP 624), and review efficiency (STEP 628). For example, the performance monitor 308 can review the efficiency of a customer's marketing strategy, investments, efficiency of a particular variable transmitted in the marketing data 216, etc.

Once the performance monitor 308 executes the selected analysis, the performance monitor 308 can display output of the analysis (STEP 632). The performance monitor 308 can display the output on the market server 108 and/or on the market client 104. Further, during and/or following the display of the output, the performance monitor 308 accepts additional marketing input 218. Additionally, the performance monitor 308 can execute any of the analysis in steps 612-628 in any order.

Figure 6B:
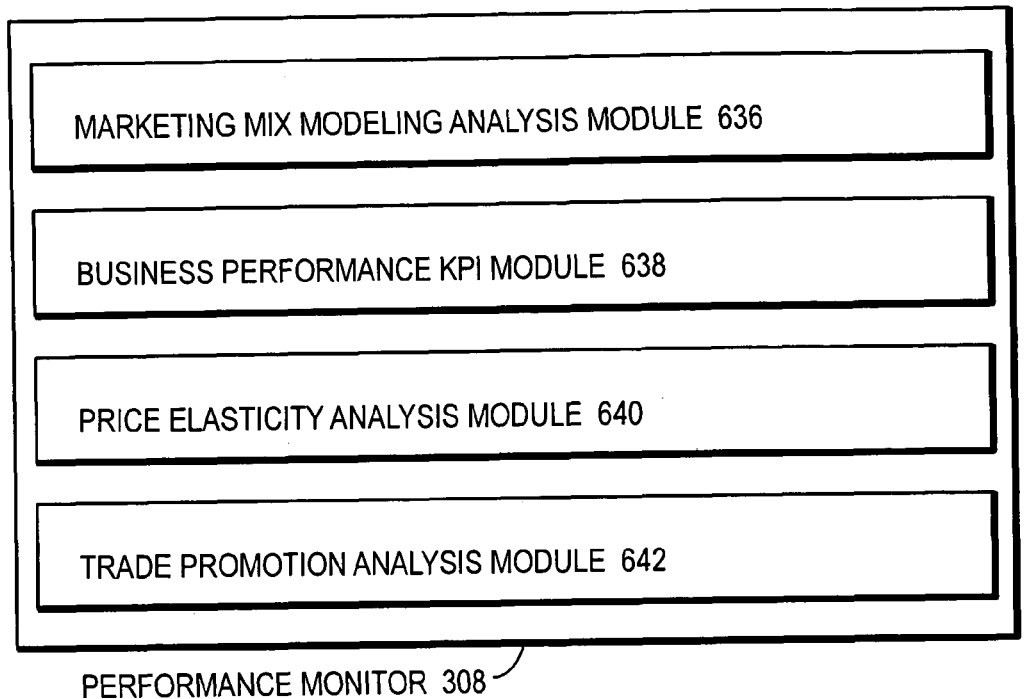
FIG. 6B is a more detailed block diagram of an embodiment of the performance monitor of FIG. 6A.

Referring to FIG. 6B, the marketing performance monitor 308 includes a marketing mix modeling analysis module 636, a business performance key performance indicator (KPI) module 638, a price elasticity analysis module 640, and a trade promotion analysis module 642. In one embodiment, the marketing mix modeling analysis module 636 analyzes and/or monitors marketing mix models, as described in more detail below. The business performance KPI module 638 analyzes and/or monitors key performance indicators relating to the market client 104. For instance, the market client 104 can request the marketing performance monitor 308 to monitor television advertising spending and the return on this spending if the market client 104 advertises in two key areas—on television and over the internet. The price elasticity analysis module 640 monitors and/or analyzes the relationship between different price points and their impact on demand. The trade promotion analysis module 642 analyzes and/or monitors trade promotion spending, campaign spending, spending on trade shows, etc., and the return on these expenditures. Although illustrated with multiple modules 636-642, the modules 636-642 may be combined into a single module. Further, although described as part of the marketing performance monitor 308, the modules 636-642 can be part of any of the above-mentioned components, such as the analytics engine 208.

Figure 7A:
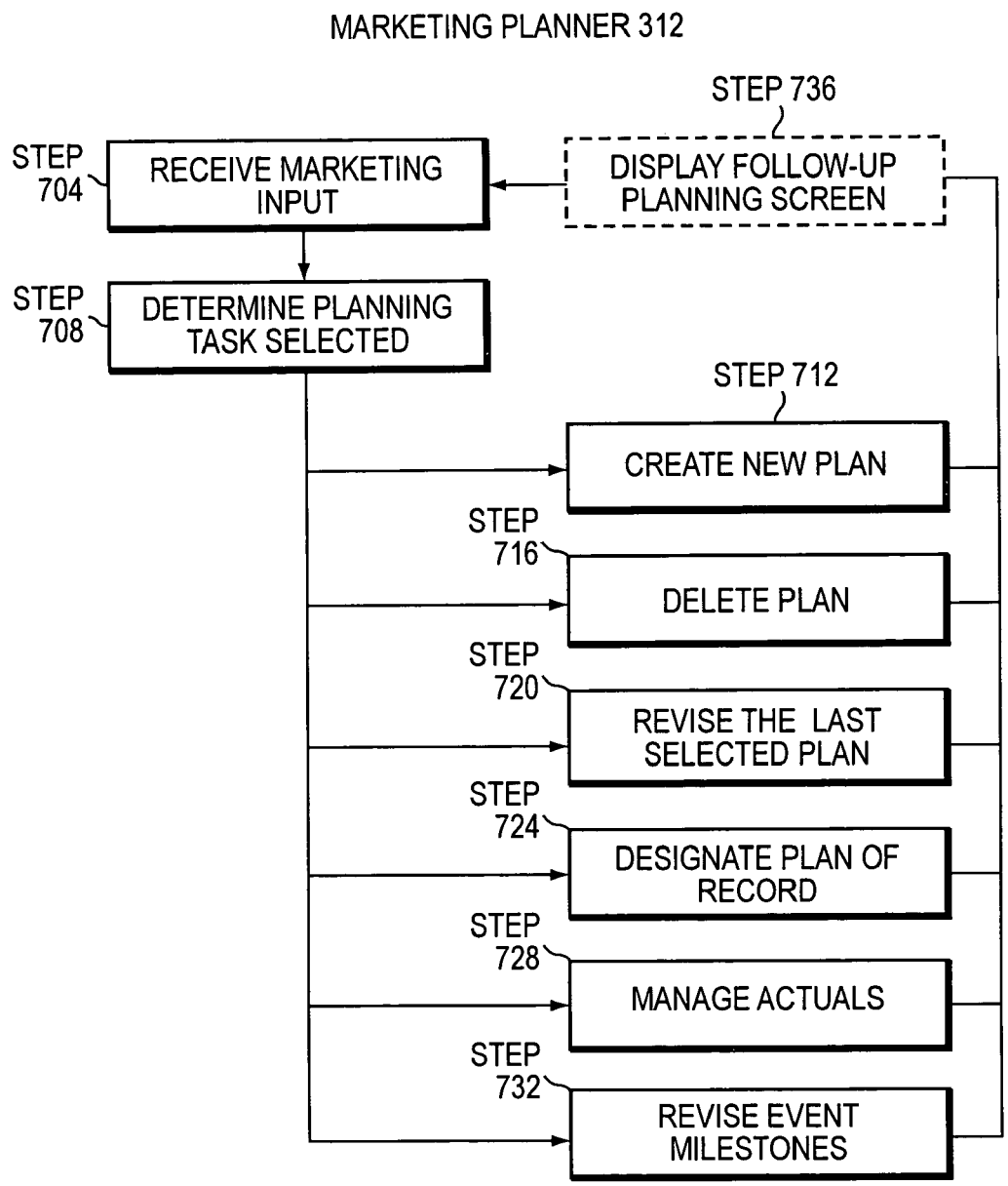
FIG. 7A is a flow chart illustrating an embodiment of the steps performed by a marketing planner.

Referring to FIG. 7A, the marketing planner 312 receives marketing input 218 (STEP 704) and determines a planning task selected by the market client 104 (STEP 708). In one embodiment, the selection of a planning task enables the market client 104 to input and/or update a marketing strategy for subsequent operations performed by the marketing optimization module 140 and/or by the components of the marketing optimization module 140. The types of planning tasks that the marketing planner 312 can provide include creating a new plan (STEP 712), deleting a plan (STEP 716), revising the last selected plan (STEP 720), designating a plan of record (STEP 724), managing actuals (STEP 728), and revising event milestones (STEP 732). In one embodiment, the marketing planner 312 displays a follow-up planning screen, which is used to obtain additional information about a plan. For example, the follow-up planning screen is a planning screen to obtain information relating to the creation of a new plan (STEP 736). Additionally, the marketing planner 312 can execute any of the planning steps 712-736 in any order.

With respect to plan creation, in one embodiment the marketing planner 312 enables the building and maintaining of one or more marketing plans within a central repository. The marketing plans can, for example, facilitate the electronic workflow of budget appropriation, review cycles, and approval cycles. Moreover, the marketing planner 312 can also enable version control of a marketing plan, consequently providing an audit trail (e.g., for milestones).

The marketing planner 312 also allows a user to specify benchmarks when building a marketing plan. Typical benchmarks include percentage of sales that are budgeted at a particular level in the plan, historical data (e.g., last year's budget), and competitor spending. If the market client 104 allocates a budget for a brand, the marketing planner 312 can provide the percentage of expected sales that the budget amount represents.

In some embodiments, the marketing planner 312 tracks productive marketing dollars versus overheads. Examples of overheads include staff, agency fees, and other expenses not directly related to meeting the marketing objectives. The marketing planner 312 may also enable a user to ensure that their budgets reconcile before submitting the budgets to the next level or phase. Moreover, the marketing planner 312 can set aside budget dollars for later appropriation.

The marketing planner 312 also supports various matrix plan structures, marketing campaigns, company reorganizations, and facilitates intuitive plan navigation. In some embodiments, the marketing planner 312 restricts access to a marketing plan or a portion of a marketing plan based on a user characteristic. The user characteristic may be a password, a particular brand or corporation that the user is working on or for, the position of the user within the market client 104, etc.

The marketing planner 312 can also provide details about specific components of a marketing plan. For example, the market client 104 accesses a media plan to determine the coverage of their brand/product lines at a given time period. For media plans, the market client 104 accesses the data, "day-part", length of spot, targeted rating points, gross rating points, creative version, etc. For trade promotions, however, the market client 104 may instead access the channel (i.e., the retailer), the tactic (e.g., feature and/or display), date, regions or retail market areas, and price.

Figure 7B:
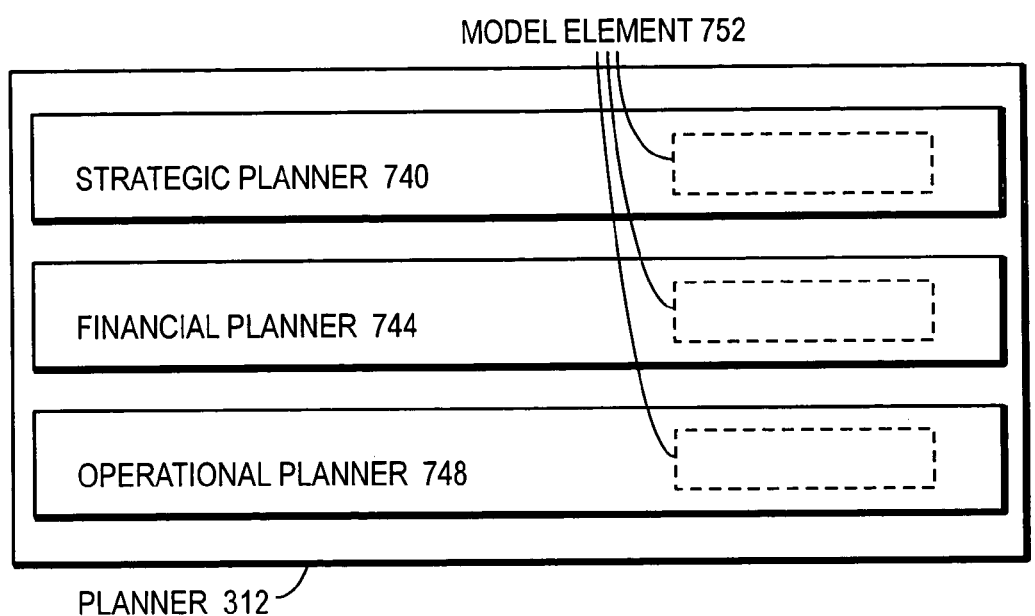
FIG. 7B is a more detailed block diagram of an embodiment of the marketing planner of FIG. 7A.

FIG. 7B shows a more detailed embodiment of the marketing planner 312. The planner 312 includes a strategic planner 740, a financial planner 744, and an operational planner 748. These components 740, 744, and 748 help enable the marketing optimization module 140 (i.e., the marketing planner 312) optimize marketing investments. Although illustrated within the marketing planner 312, any or all of the strategic planner 740, the financial planner 744, or the operational planner 748 can be externally located from and in communication with the marketing planner 312 (and/or the marketing optimization module 140).

The strategic planner 740 enables the marketing planner 312 to plan or forecast the market client's goals, objectives, and/or processes. For example, the strategic planner 740 can plan or forecast a market's response to a particular market strategy. A market strategy may be to purchase a particular number of items, to allocate a portion of a marketing budget to a product or product line, to save a particular portion of a marketing budget, and the like. An example of an objective metric includes objectives set for sales and for profit. Objectives can be set for the entire corporation or for a level or department of a corporation. Users can use the marketing plan to track these metrics (e.g., the objective metrics). Another example of metrics that the marketing plan can track and maintain includes return on marketing metrics. Moreover, the marketing planner 312 also enables the creation of and maintenance of multiple plans for a single market client 104. Multiple plans enable the market client 104 to have plans for subsets of the corporation. A user of the market client 104 can also record notes within the plan.

The financial planner 744 plans budgets, estimates, and/or actuals of the market client 104. For example, the financial planner 744 can receive a market client's total budget and estimate the amount that should be spent in particular product lines or in particular advertising techniques, such as television advertising, to optimize marketing investments.

The operational planner 748 performs execution resource management and/or tracking resource management. In one embodiment, execution resource management is the management of resources during the execution of a marketing strategy. The management can include the measurement of resources, notification of a user that a resource is beyond an expected value, etc. Resources can include dollars spent, returns on investments, and time spent on a project (e.g., promoting a product). The resources can be based on total expenditures or expenditures per product line or per market category.

Each planner 740, 744, and 748 can also include a model element 752. The model element 752 enables the respective planner 740, 744, and 748 to model the market for planning purposes. For example, the financial planner 744 can plan a financial budget of the market client 104 and test the financial budget on a market with the model element 752.

Figure 8:
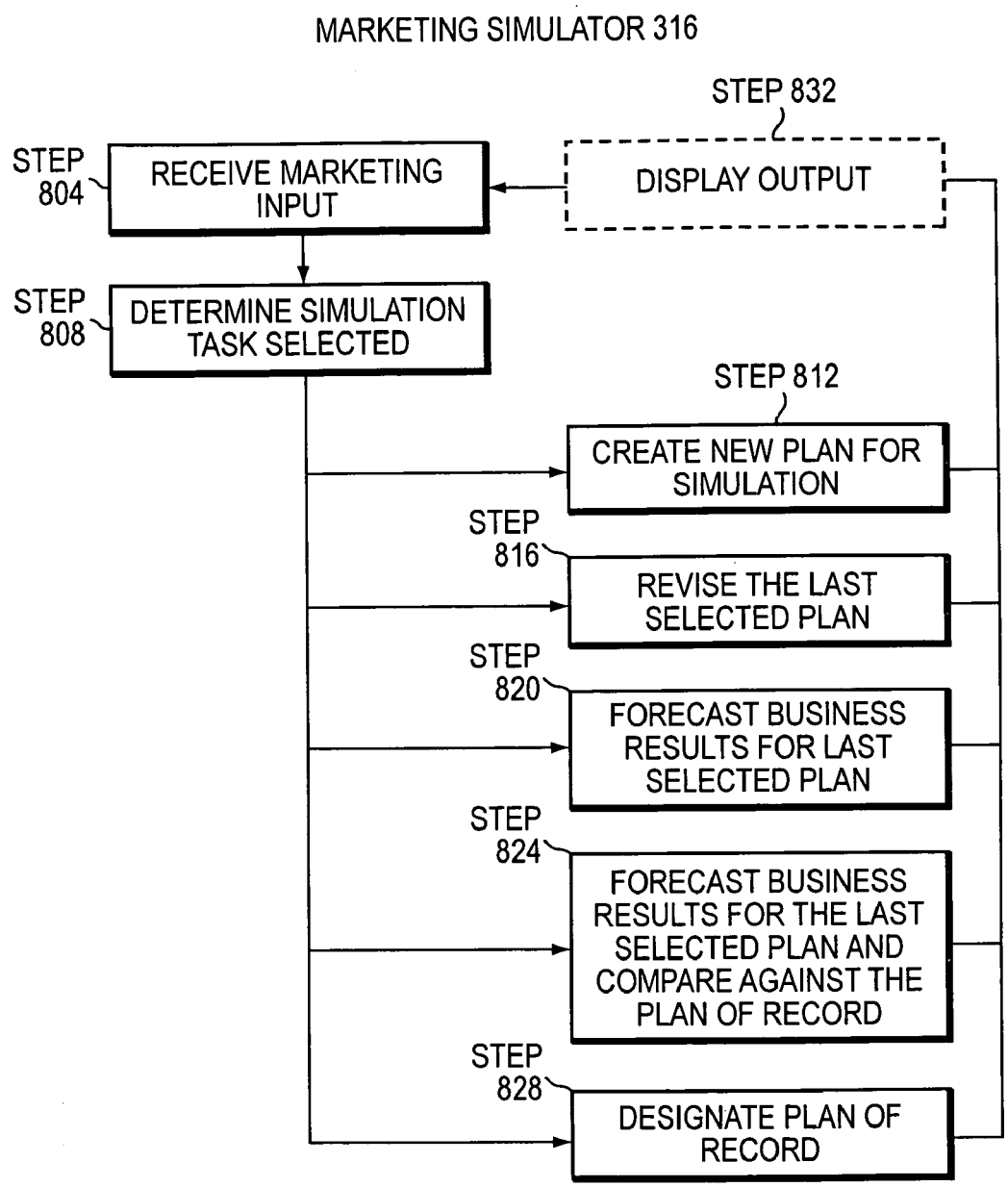
FIG. 8 is a flow chart illustrating an embodiment of the steps performed by a marketing simulator.

Referring to FIG. 8, the marketing simulator 316 receives marketing input 218 (STEP 804) and determines a simulation task selected by, for example, the market client 104 (STEP 808). In one embodiment, the types of simulation tasks that the marketing simulator 316 can provide include creating a new plan for simulation (STEP 812), revising the last selected plan (STEP 816), forecasting business results for the last selected plan (STEP 820), forecasting business results for the last selected plan and comparing the results against results associated with the plan of record (STEP 824), and designating a plan of record (STEP 828).

Once the marketing simulator 316 executes the selected simulation task, the marketing simulator 316 can display output of the simulation (STEP 832). The marketing simulator 316 can display output on the market server 108 and/or on the market client 104. Further, during and/or following the display of the output, the marketing simulator 316 accepts additional marketing input 218. Additionally, the marketing simulator 316 can execute any of the simulation steps 812-832 in any order.

Figure 9A:
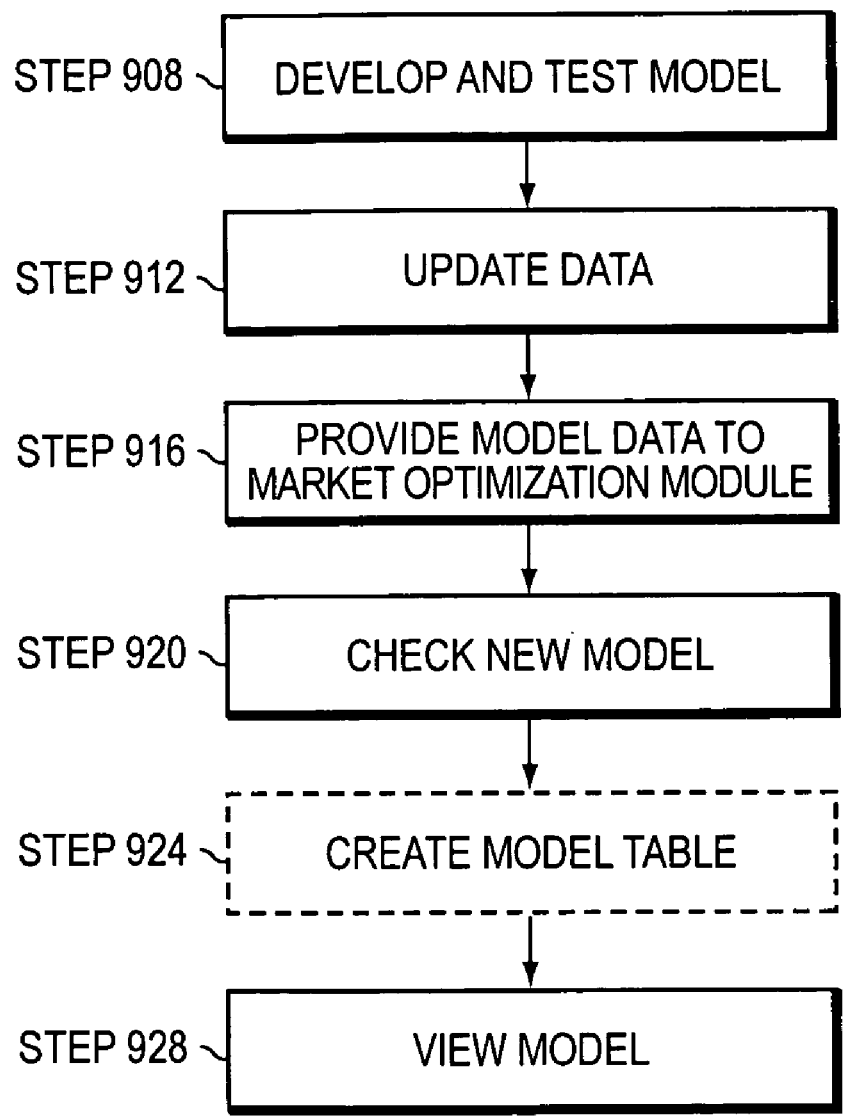
FIG. 9A is a flow chart illustrating an embodiment of the steps performed to create and update a model.

Referring to FIG. 9A, a model used by the analytics engine 208 is transmitted by the market client 104 as part of the marketing data 216 and/or the marketing input 218 to the marketing optimization module 140. The model may be created (and/or updated) by, for example, a company (e.g., operating the market client 104), a market analyst (e.g., operating the market client 104), an operator of the market server 108, the analytics engine 208, etc.

In one embodiment, the market client 104 obtains data for a specified time period and for specific data elements. Examples of the specific data elements include media plans and buys, specific external factors, specific business results, etc. In one embodiment, the market client 104 develops and tests a model definition, or model, based on this data (STEP 908). Moreover, the market client 104 can transmit this data as part of the marketing data 216 (and/or marketing input 218) to the market server 104 and subsequently retrieve the data 216 when developing and/or testing a new model. In one embodiment, the market client 104 uses an independent software tool to create a model for the data. Alternatively, the marketing optimization module 140 obtains the marketing data 216 and models the data 216.

Upon completing the development and/or testing of the model, the market client 104 may again retrieve and/or update the data described above to ensure the modeling of current data (step 912). The market client 104 then provides a model definition to the marketing optimization module 140 (STEP 916). The marketing optimization module 140 receives/obtains the model definition and, in one embodiment, the market client 104 checks the model definition using the analytics engine 208 (STEP 920). Moreover, in one embodiment, the analytics engine 208 creates a new version of a model when receiving an update to a previously created model definition.

In one embodiment, the analytics engine 208 then creates or updates a model table for the new model definition obtained from the market client 104 (STEP 924). The model table may include information such as whether the model definition is the current model (e.g., the start and end dates of the time period for a particular model, a model version number, the model creator (e.g., author, machine), and an indicator denoting whether the model was ever designated as the model of record). In some embodiments, the analytics engine 208 alerts one or more market clients 104, 124 when a new model is provided to the analytics engine 208. Moreover, in other embodiments, the market client 104 can view a model used by the analytics engine 208 (STEP 928). The market client 104 can also instruct the marketing optimization module 140 to delete a model.

In one embodiment the analytics workbench 324 formats the marketing data 216 (and/or marketing input 218) into the formatted marketing information 220 described above in FIG. 2A. In one embodiment, the formatted marketing information 220 is a model format that is usable by the analytics engine 208.

Exemplary types of marketing models include marketing mix models, price elasticity models, choice models, and response models. A marketing mix model uses statistical regression techniques to determine the impact of the components of the marketing mix on a specific business measure, such as on volume, share, and/or sales. The marketing mix model uses "controllables," or factors that the modeler (e.g., the market client 104) controls, such as the amount of advertising investment over a time period, the promotions run, etc. The modeler (e.g., the market client 104) needs to access all marketing mix investments (e.g., event plans) by a predetermined time period (e.g., week) for the historical period to create the model.

The marketing mix model also includes "uncontrollables," or factors over which the market client 104 (i.e., the model builder) has no control, such as economic factors, seasonality, and competitive factors. These uncontrollables, or market factors, can vary from industry to industry and from company to company. The modeler compiles historical values for these factors. The marketing optimization module 140 facilitates obtaining the required data points over the market communications network 116. In one embodiment, the marketing optimization module 140 notifies the modeler when a model term level reaches a particular threshold value.

In one embodiment, once a model has been constructed, the marketing simulator 316 can be used as a basis for forecasting. The marketing simulator 316 can use the model by assuming or projecting the value for each model term over the period for which the user wants to forecast. For example, if the model included terms for television advertising, print advertising, trade promotion, and NASDAQ 3-Day Moving Average, the marketing simulator 316 projects the values for each of these terms over a predetermined period. The marketing simulator 316 then calculates the forecasted outcome of a dependent variable. The dependent variable is the measure to be modeled. Examples of the dependent variable include units sold, market share, and new accounts.

Figure 9B:
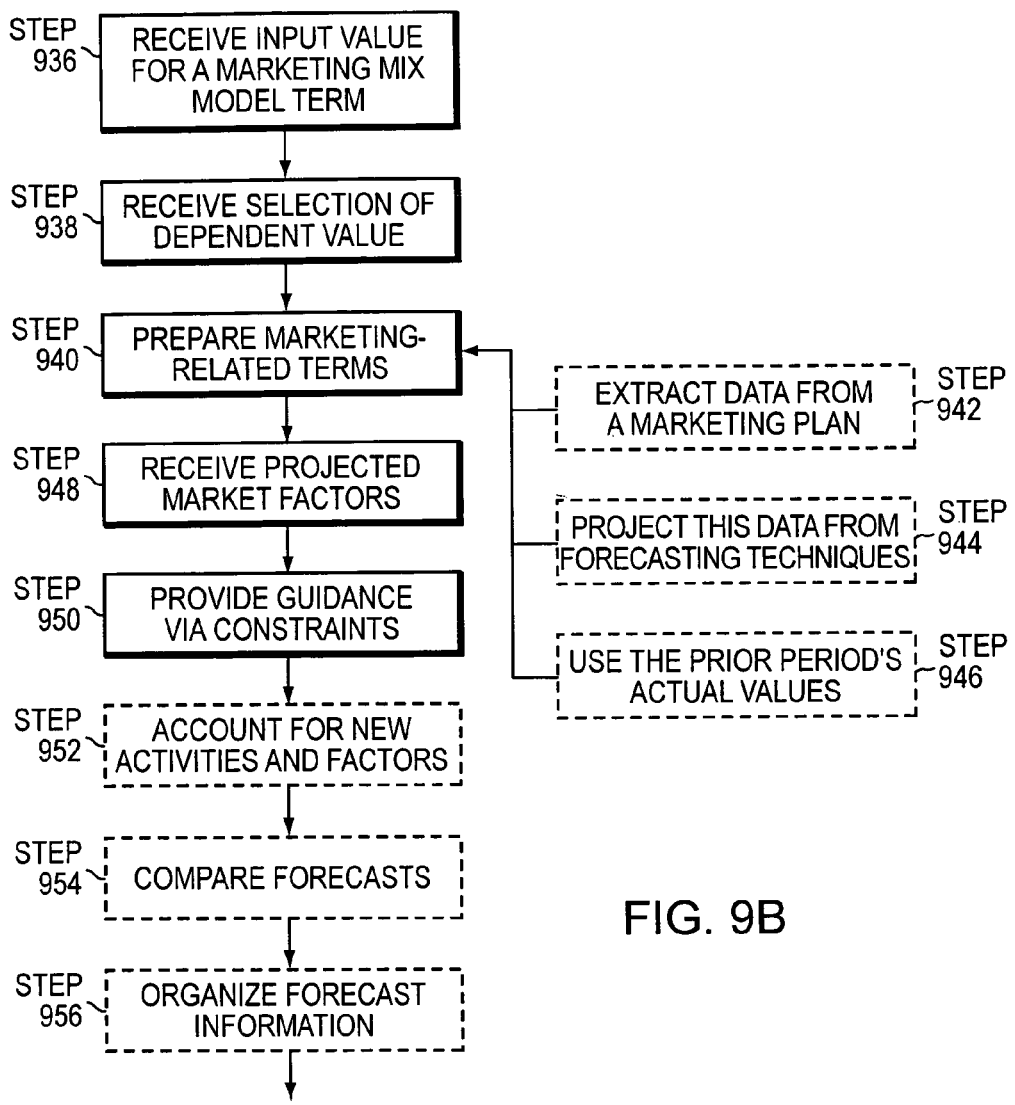
FIG. 9B is a flow chart illustrating an embodiment of the steps performed by the marketing simulator 316 to generate a forecast using a marketing mix model.

FIG. 9B illustrates the steps that the marketing simulator 316 uses to generate a forecast using a marketing mix model. The simulator 316 projects the value for each model term over the period for which the user wants to forecast. In one embodiment, the marketing simulator 316 receives an input value for a marketing mix model term (step 936). The marketing simulator 316 then receives a selection of a dependent value from the market client 104 (step 938). The dependent variable may be the variable that the market client 104 requests to forecast and at a granularity level. The marketing simulator 316 can forecast at various granularity levels. For example, a market client 104 may want to forecast sales for a specific brand in a specific market. Alternatively, the market client 104 may want to forecast sales for a portfolio of brands in a national market.

The marketing simulator 316 prepares the marketing-related terms, or marketing investments, such as advertising levels across media, trade activity, pricing, etc., for forecasting (step 940). In one embodiment, the marketing simulator 316 prepares the marketing investments by extracting the data from a marketing plan (step 942). This occurs when a marketing plan for the future forecasting period already exists electronically. The marketing simulator 316 obtains input from the market client 104 that includes a selection of the portion of a plan or of multiple plans for the forecast. In particular, the market client 104 uses the marketing plan to obtain information on applicable variables. Moreover, the marketing optimization module 140 may transform the data within the marketing plan from monthly or quarterly numbers into weekly numbers (or some other format, such as daily numbers). Thus, the marketing optimization module 140 may adjust the marketing plan to provide data consistent with a requested forecast.

Alternatively, the marketing simulator 316 projects the data based on statistical time series forecasting techniques (step 944). For example, the marketing simulator 316 may use historical data to apply one or more time series algorithms to project the data. In yet other embodiments, the marketing simulator 316 uses the prior plan investment period's actual values if, for example, the values do not vary much from year to year (step 946). The marketing simulator 316 may also enable adjustment of all or some of the data.

The marketing simulator 316 obtains market factors from the market client 104 that the market client 104 is projecting (step 948). The marketing optimization module 140 provides guidance to the market client 104 with a guided analysis (step 950). In one embodiment, the guidance is by way of constraints. The constraints can be, for example, a predetermined threshold or range for each independent variable of data values used to construct the model. In one embodiment, the marketing optimization module 140 enable users of the market client 104 to tweak the model by adding, for example, a new term or coefficient to the model. Thus, the marketing optimization module 140 accounts for new activities and factors of a marketing investment (step 952). In some embodiments, the marketing optimization module 140 also enables a market client 104 to compare multiple forecasts (step 954) and/or organize forecast information (step 956).

Examples of the marketing analysis include marketing mix analysis or marketing response analysis, price elasticity analysis, trade promotion analysis, market basket analysis, new product pre-market analysis, market structure analysis, customer life time value analysis, and segmentation analysis. In one embodiment, the marketing mix analysis or marketing response analysis is used to understand the relationships between different investment levels across different marketing vehicles and business results. For example, the market client 104 (or market server 108) can perform marketing mix analysis to facilitate determination of the ROI for each marketing investment type, the halo effect of marketing against one brand on other brands, and the rates of decay and the saturation points for different marketing vehicles and different messages.

A price elasticity model determines the relationship between price and demand. In one embodiment, the price elasticity analysis module 640 performs operations on and facilitates organization of a price elasticity model. This type of model yields curves which show the projected demand at different price points for a product or service. A choice model represents the selection of one among a set of mutually exclusive alternatives. This type of model can be used to determine the probability of a specific choice as a function of the attributes of the products or services being considered. A response model analyzes and predicts how target consumers respond to specific offers.

The statistical technique used to build models vary depending on the model type. For instance, linear or non-linear regression models are used to generate marketing mix models. Time series forecasting is used to build trade promotion analysis models and uses logistical regression to build choice models. The trade promotion analysis can be used to understand the relative performance of different trade tactics, including discounts, on incremental volume (e.g., short-term or long-term). The market basket analysis can be used to understand consumer shopping patterns. The new product pre-market analysis can be used for planning new product introductions. The market structure analysis analyzes market dynamics for a particular product or service, and the customer life time value analysis determines life time value potential for individual customers. The segmentation analysis analyzes key customer groups for a particular product or service. The market client 104 (or market server 108) performs these types of marketing analyses to facilitate determination of a marketing strategy that optimizes marketing investments.

To facilitate this determination, the analytics engine 208 can create an analysis path through the results of one or more analyses. The analytics engine 208 enables the market client 104 to select a scope of analysis, which can map directly to a marketing model (e.g., that corresponds with a particular line of business). In another embodiment, the marketing optimization module 140 performs the marketing analysis described above.

Different types of marketing analysis can use different analysis techniques. For example, statistical analysis may use regression modeling (i.e., linear and non-linear analysis), such as for marketing mix analysis, and another marketing analysis type may use on-line analytical processing (OLAP) for multi-dimensional analysis.

Figure 9C:
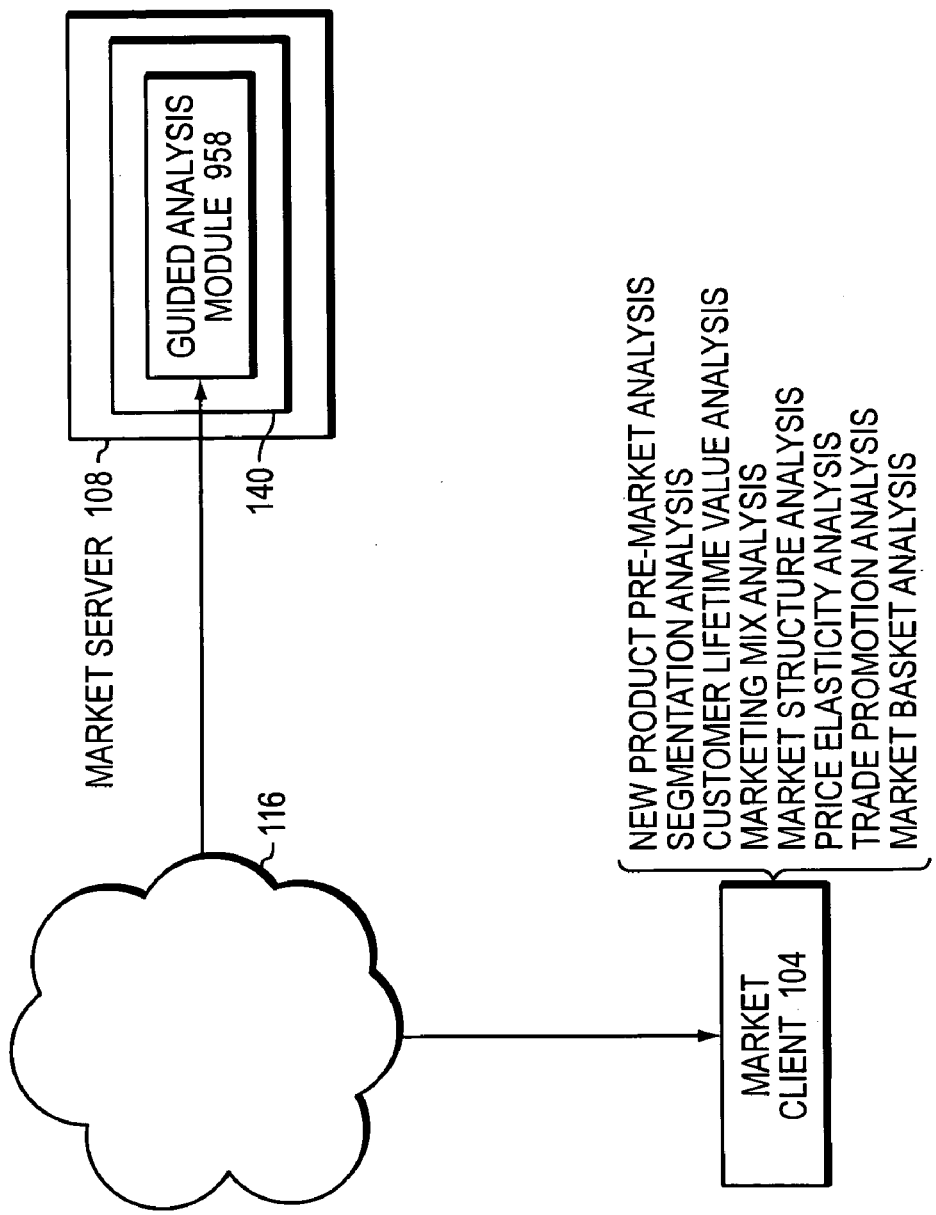
FIG. 9C is a block diagram of the marketing optimization module of FIG. 2A containing a guidance analysis module.

FIG. 9C shows the marketing optimization module 140 containing a guidance analysis module 958. In one embodiment, the marketing performance monitor 308 contains the guided analysis module 958. The guided analysis module 958 communicates with the market client 104 over the market communications network 116. For example, the market client 104 performs a type of market analysis, such as a new product pre-market analysis, a segmentation analysis, a customer lifetime value analysis, a marketing mix analysis, a market structure analysis, a price elasticity analysis, a trade promotion analysis, or a market basket analysis. The guided analysis module 958 communicates with the market client 104 to provide guidance to the market client 104.

In particular, the analysis of marketing data may require accessing data from many sources and examining many different views of the data. For example, in a marketing mix analysis, the market client 104 can examine cost information, competitive share of voice information, market share information, copy test results, brand metrics, etc. The guided analysis module 958 groups marketing outputs that are organized to assist the market client 104 in answering a particular marketing input 218.

Figure 9D:
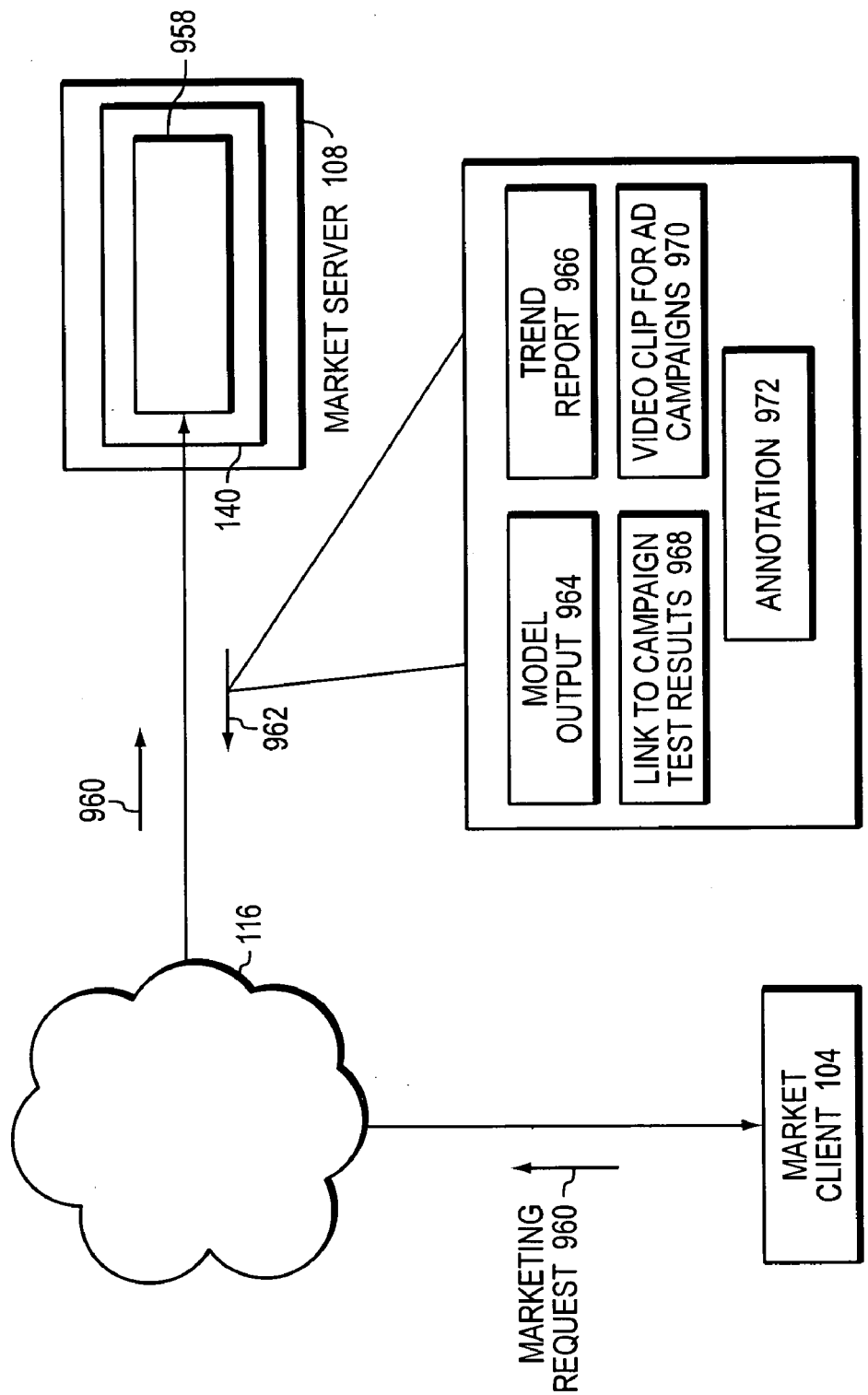
FIG. 9D is a block diagram of the guidance analysis module of FIG. 9C providing a guided analysis result to a market client.

For example and referring to FIG. 9D, the market client 104 submits a marketing request 960 to the market server 108. In one embodiment, the marketing request 960 includes a request to determine the correlation between marketing to sales for a given period of time. The marketing optimization module 140 receives this marketing request 960 and forwards it to the guided analysis module 958. The guided analysis module 958 performs statistical analysis on the marketing data 216 (and/or the formatted data 220) in response to the request 960. In one embodiment, after the statistical analysis is complete, the guided analysis module 958 reports factual information relating to the multi-dimensional marketing data 216 (and/or the formatted data 220). The guided analysis module 958 then analyzes the factual information and the marketing data using a statistical analysis to produces a guided analysis marketing result 962. The factual information and/or guided analysis result 962 can include, for example, a model output 964, a trend report 966, a link to campaign test results 968, a video clip for advertisement campaigns 970, and/or an annotation 972.

In one embodiment, the model output 964 shows the relative contribution of marketing to sales versus a baseline. The trend report 966 can overlay the marketing contribution to sales with the marketing budget over a time period. The trend report 966 can also show awareness, preference, and consideration levels over the same time period. In one embodiment, the link 968 is a link to copy test results for the major campaigns run during the time period. Further, the video clip 970 is a video clip for one or more of the major advertisement campaigns run during the time period.

An annotation 972 is a note providing an explanation for key observations and findings. The annotation 972 can also aid in collaboration as some or all of the analysis permeates through a corporation. In one embodiment, the guided analysis module 952 annotates multiple parts of the guided analysis result 962. Further, the market client 104 may also be able to annotate the guided analysis result 962.

In one embodiment, the factual information includes a budget of the market client 104. The budget includes a spent portion and an unspent portion. Further, the marketing optimization module 140 analyzes (e.g., models) only the unspent portion of the budget.

Figure 9E:
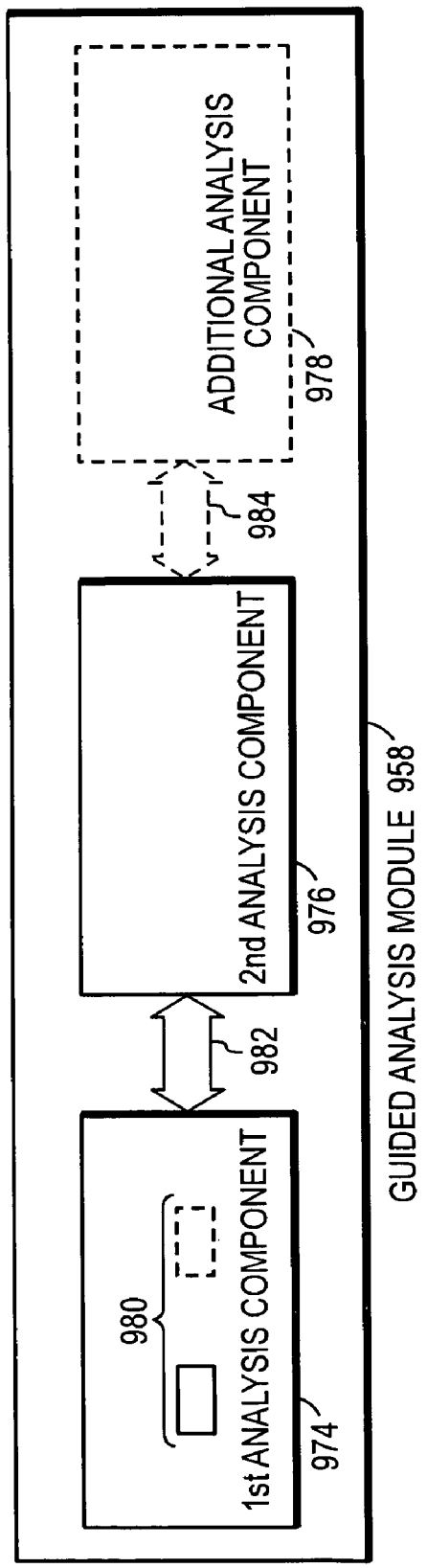
FIG. 9E is a more detailed block diagram of an embodiment of the guided analysis module of FIG. 9C.

Also referring to FIG. 9E, the guided analysis module 958 performs the guided analysis by linking a first guided analysis component 974 with a second guided analysis component 976. The guided analysis module 958 may link any number of guided analysis components, such as an additional guided analysis components 978 with the second guided analysis component 976. In one embodiment, the guided analysis component 974, 976, 978 is a component that contains one or more attributes 980 used in an analysis step. Examples of an attribute 980 of the guided analysis component 974, 976, 978 include a measurement, a dimension, a filter, a drill level, a chart type, a chart setting, and a model term. The guided analysis components 974, 976, 978 can also include the marketing data 216. The linking is shown with linking arrows 982, 984. In one embodiment, the linking carries common attributes 980 forward from the first guided analysis component 974 to the second guided analysis component 976. Moreover, the guided analysis module 958 can additionally enable annotation of and publishing of the analysis components 974, 976, 978. Thus, in one embodiment, the first market client 104 can create a first guided analysis component 974 and a second market client 124 can view the first guided analysis component 974 on the web. Further, if the second market client 124 creates a second guided analysis component 976, the second market client 124 can link the second guided analysis component 976 with the first guided analysis component 974.

In one embodiment, the guided data integration is driven by editing of the data 216 by a user of the market client 104. As described above, the user editing can include, for example, allocating or apportioning the data 216. Moreover, the above editing can also occur on the formatted marketing data 220 before being reported and/or analyzed.

In one embodiment, the analytics engine 208 (and/or the marketing simulator 316) analyze variances. Further, the analytics engine 208 can additionally use one or more models to analyze variance causes, such as if the economy performed worse than predicted when the forecast was generated, a particular advertisement campaign drove more sales than forecasted, and a competitor's aggressive price eroded market share. The analytics engine 208 also enables the monitoring of forecasted versus actual performance periodically. Moreover, the marketing optimization module 140 can proactively notify the market client 104 if a variance of a predetermined amount occurred, if a variance of a particular type occurred, etc. This notification may be via email, a web notification, a sound clip, and the like. Although described above as receiving, for example, the marketing input 918, the system can alternatively or additionally obtain (i.e., pull) the input from the client 104.

Referring to FIG. 10, an embodiment of the formatting process to create the formatted marketing information 220 is shown. The marketing optimization module 140 receives revenue from a business driver 1004 operating the market client 104. In order for the analytics engine 208 to properly analyze (e.g., model) a marketing strategy based on these revenues, the analytics workbench 324 has to format the revenues into a proper model format. In one embodiment, the analytics workbench 324 applies a modeling coefficient 1008 and a modeling transformation expression 1012 to the revenues to obtain the formatted marketing information 220. In some embodiments, the analytics workbench 324 and/or the analytics engine 208 also includes a term description describing the model information and/or transformation technique. The business driver 1004 may provide information relating to a product, a business, geography, organization of a business, customers, or a business channel.

Moreover, in one embodiment the marketing optimization module 140 is configurable. For example, a market client 104 can choose to have a marketing performance monitor report show only the modeled values or both modeled values and non-modeled values together.

Figure 11:
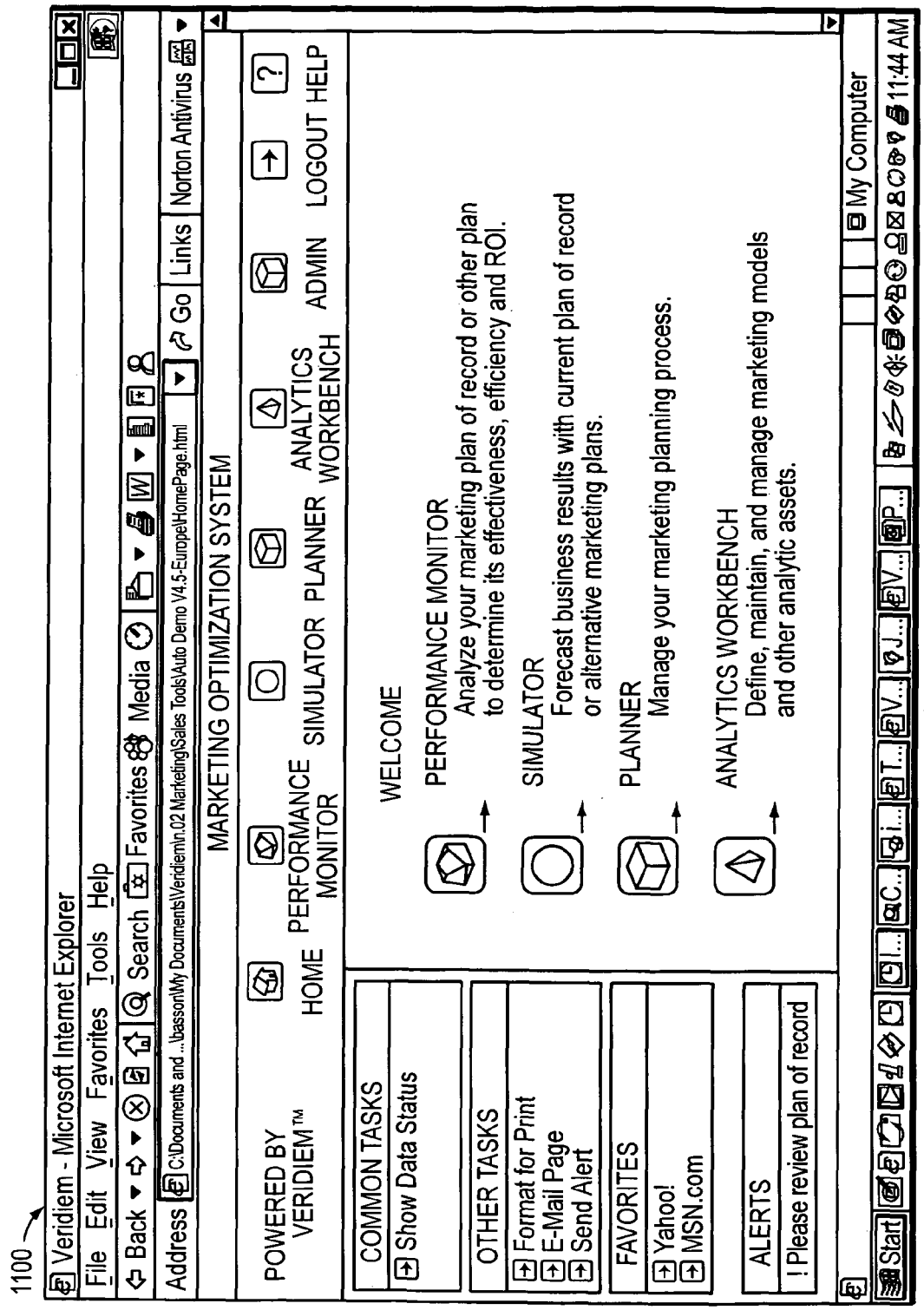
FIG. 11 is an embodiment of a selection screen 1100 to select a marketing option for the marketing optimization module of FIG. 2A.
Figure 12:
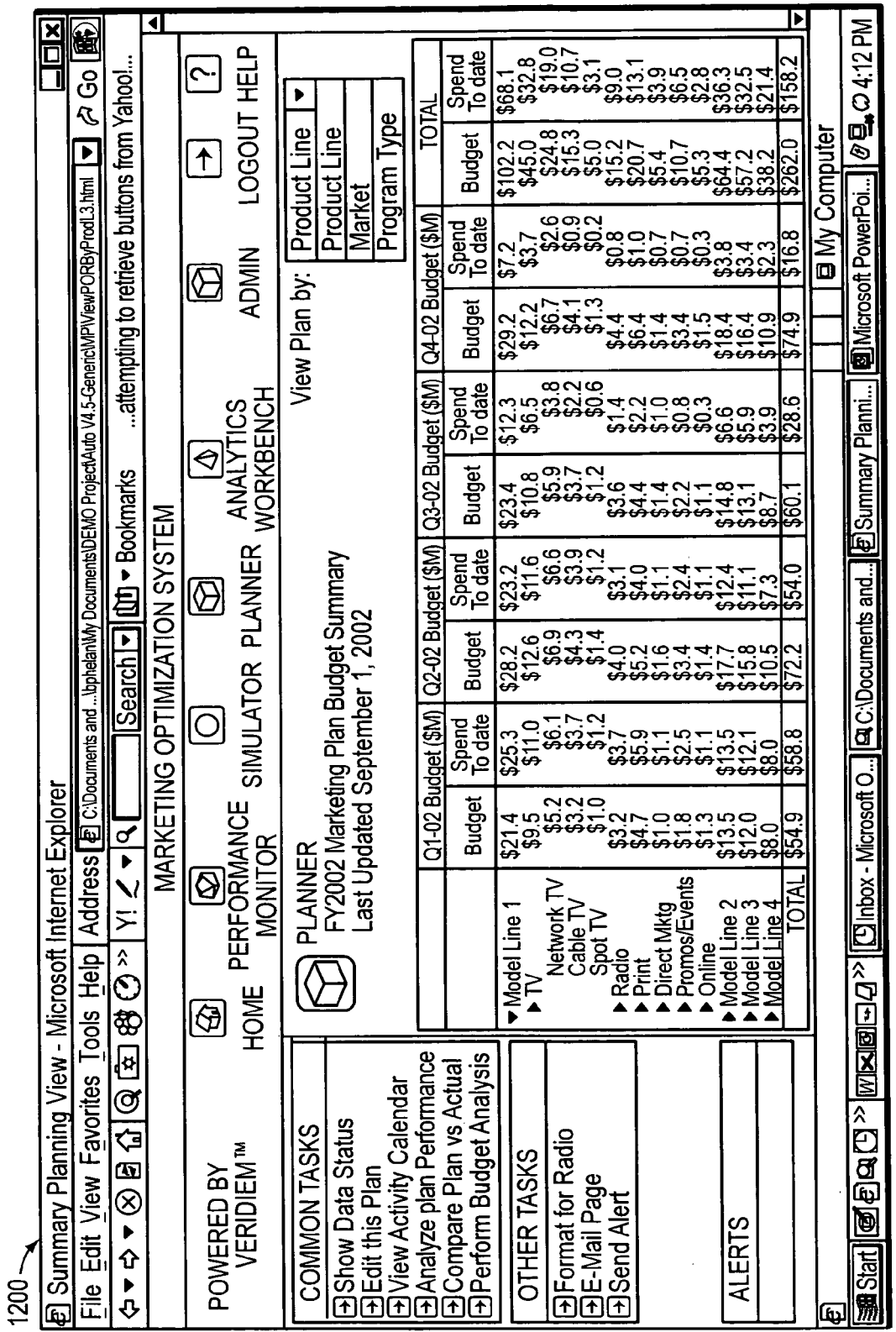
FIG. 12 is an embodiment of a screen shot of a marketing plan budget summary.
Figure 14:
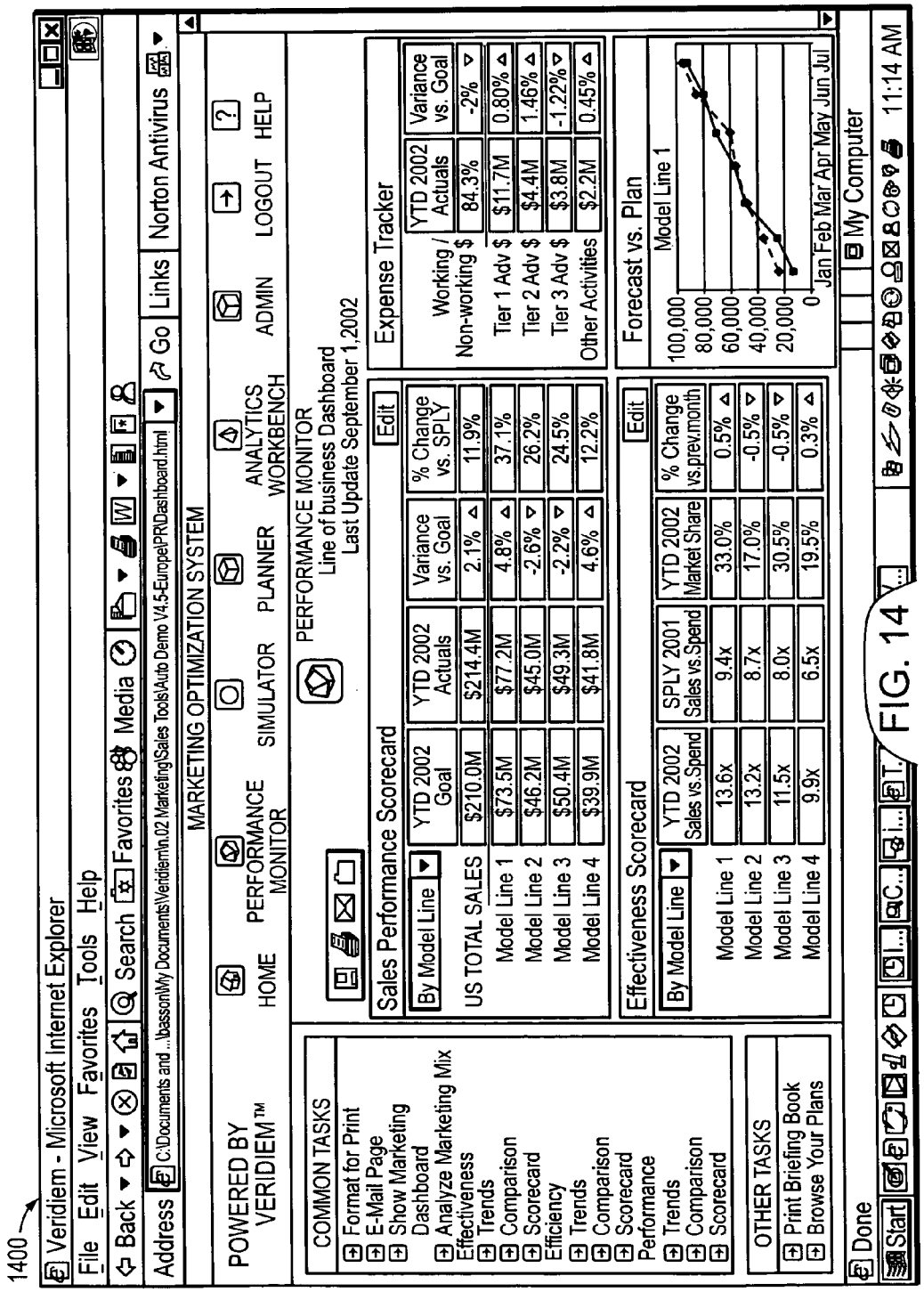
FIG. 14 is an embodiment of a screen shot of a line of business view having a sales performance scorecard, an effectiveness scorecard, an expense tracker, and a graph relating forecast and plan.

Exemplary screen shots provided by the marketing optimization module 140 (e.g., on the market client 104) are shown in FIGS. 11-23. In particular and referring to FIG. 11, an exemplary selection screen 1100 displayed by the input subsystem 204 is shown. FIG. 12 shows an exemplary screen shot of a marketing plan budget summary 1200. The summary 1200 shows that the marketing planner 312 facilitates viewing of the budget for different quarters and for different marketing spending (e.g., for print advertising and for radio advertising). FIG. 13 illustrates a screen shot 1300 showing a more detailed marketing plan of a market client (e.g., a network television advertising plan). FIG. 14 shows an exemplary screen shot 1400 providing a line of business view (i.e., a sales performance scorecard and an effectiveness scorecard). The screen shot 1400 also shows an expense tracker and a forecast vs. plan analysis.

Figure 15:
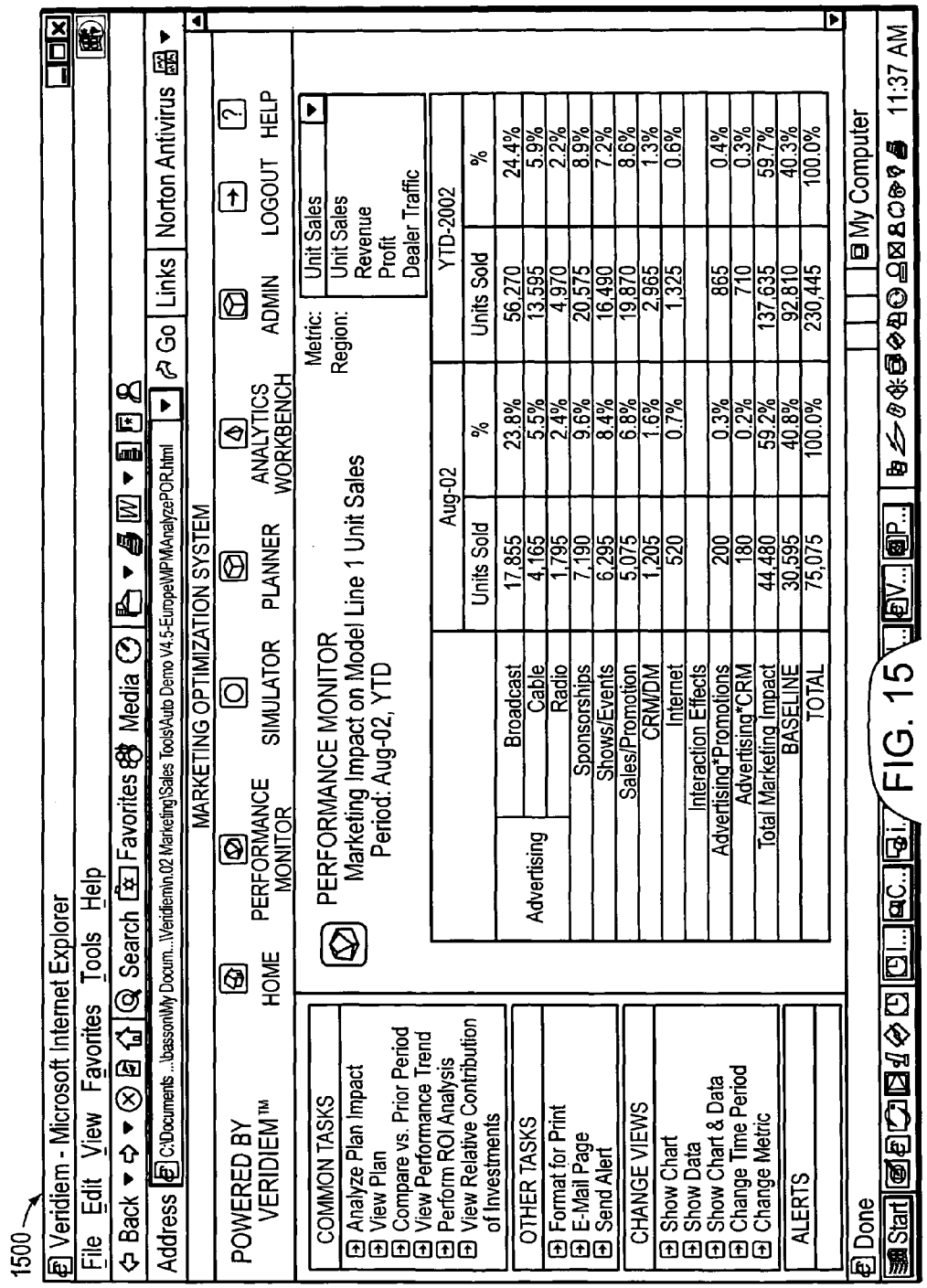
FIG. 15 is an embodiment of a screen shot of marketing impact on unit sales.
Figure 16:
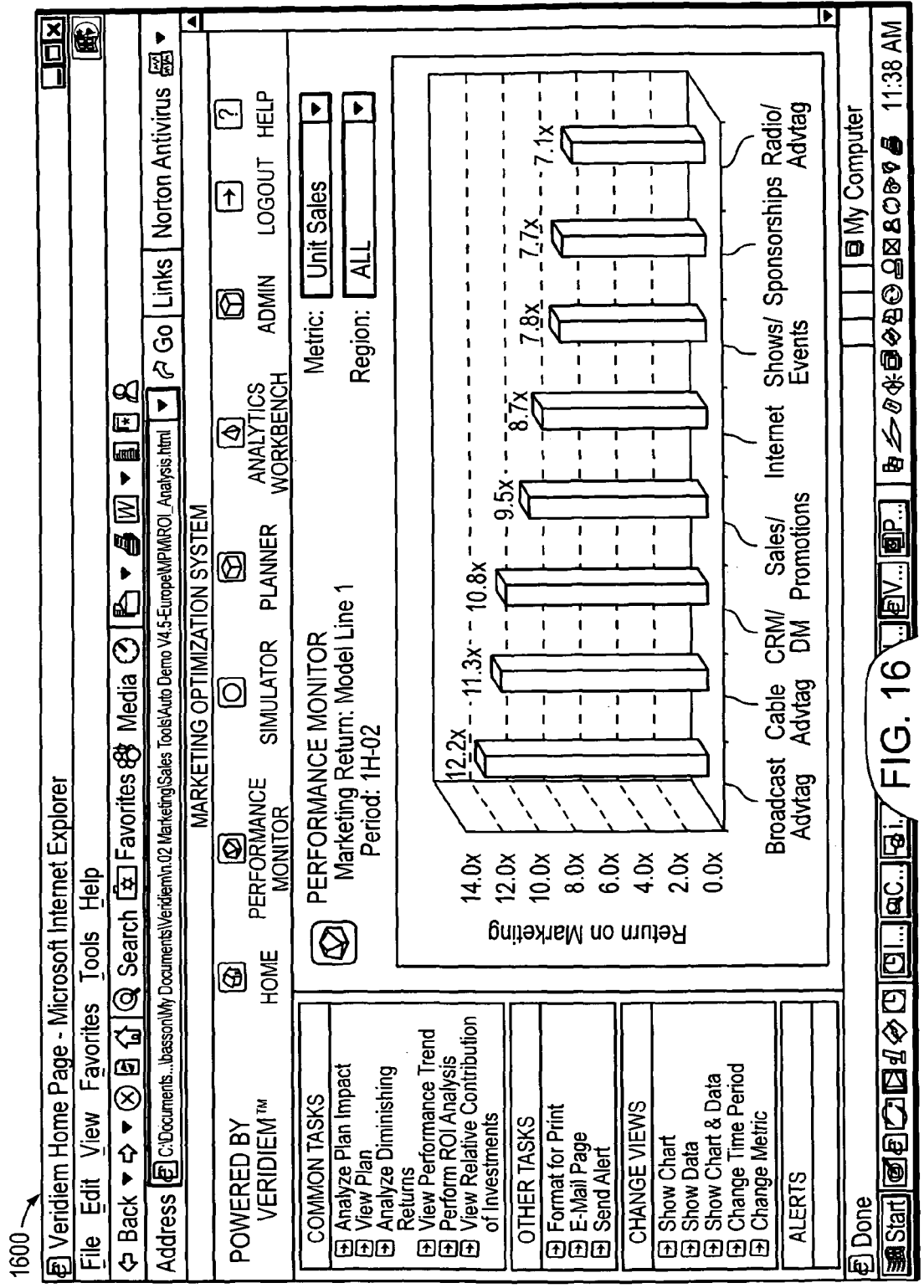
FIG. 16 is an embodiment of a screen shot of a graphical output of the marketing return for a portion of a marketing plan.
Figure 17:
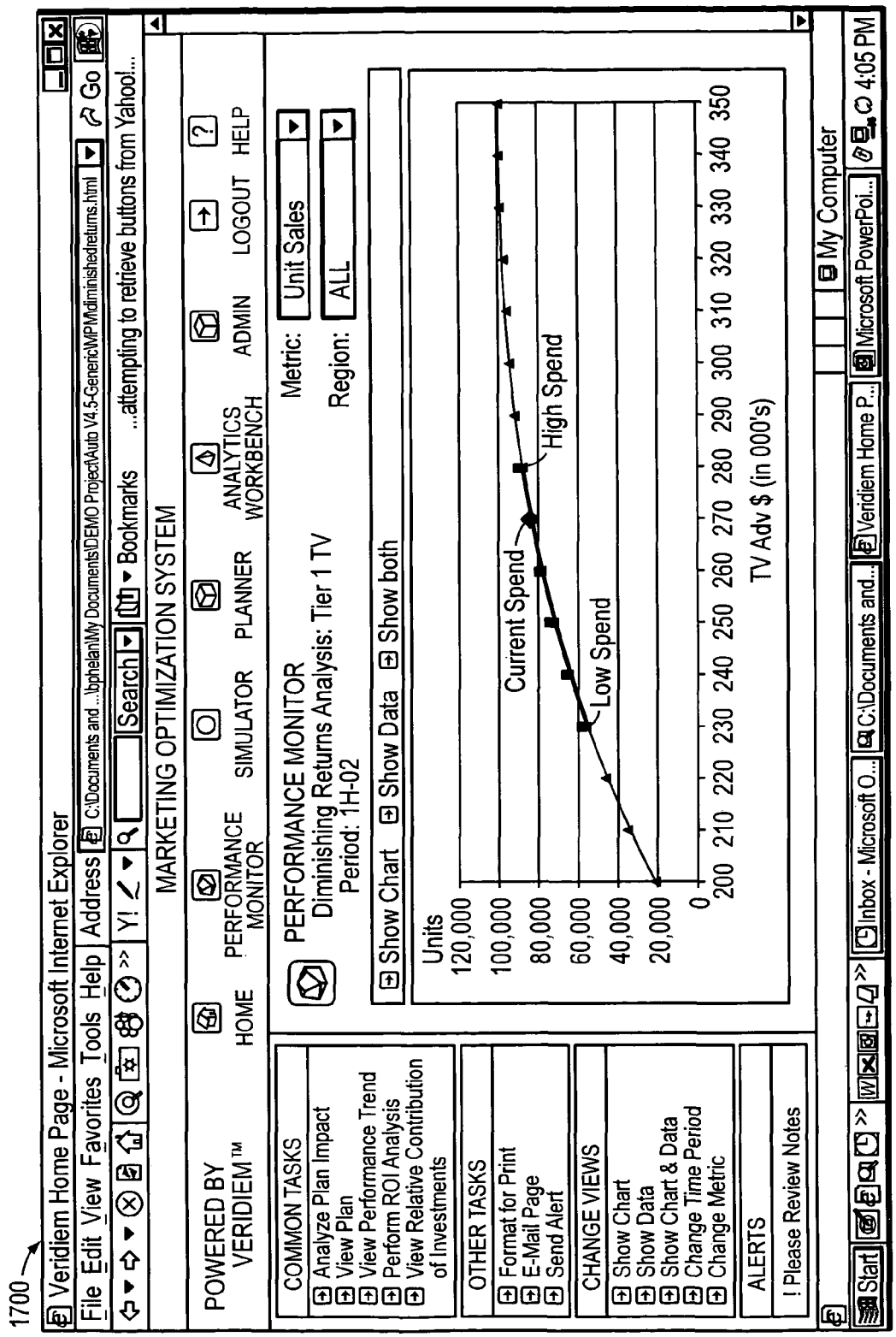
FIG. 17 is an embodiment of a screen shot showing diminishing returns analysis for tier 1 television spending.
Figure 18:
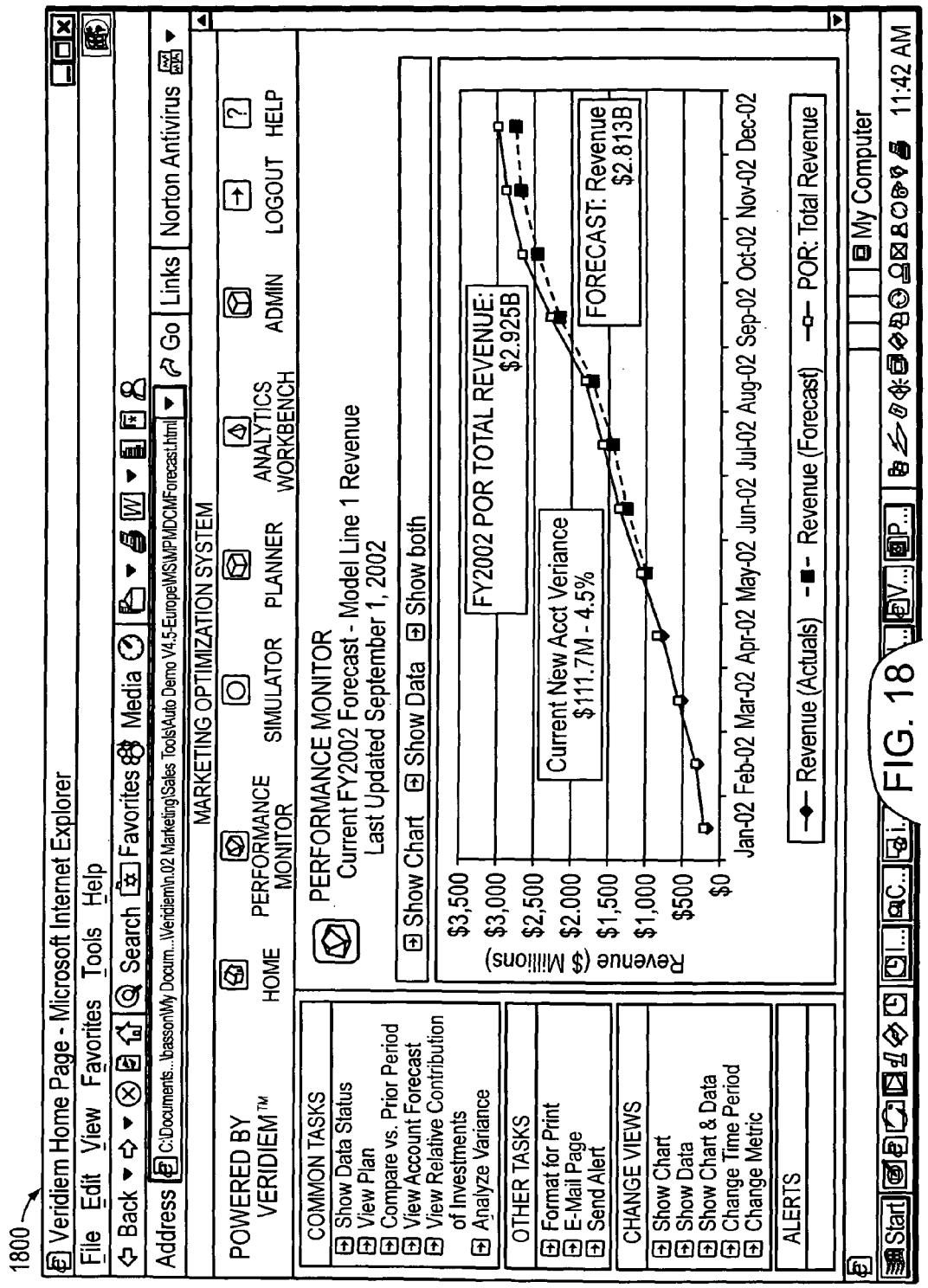
FIG. 18 is an embodiment of a screen shot displaying a year forecast for revenue.
Figure 19:
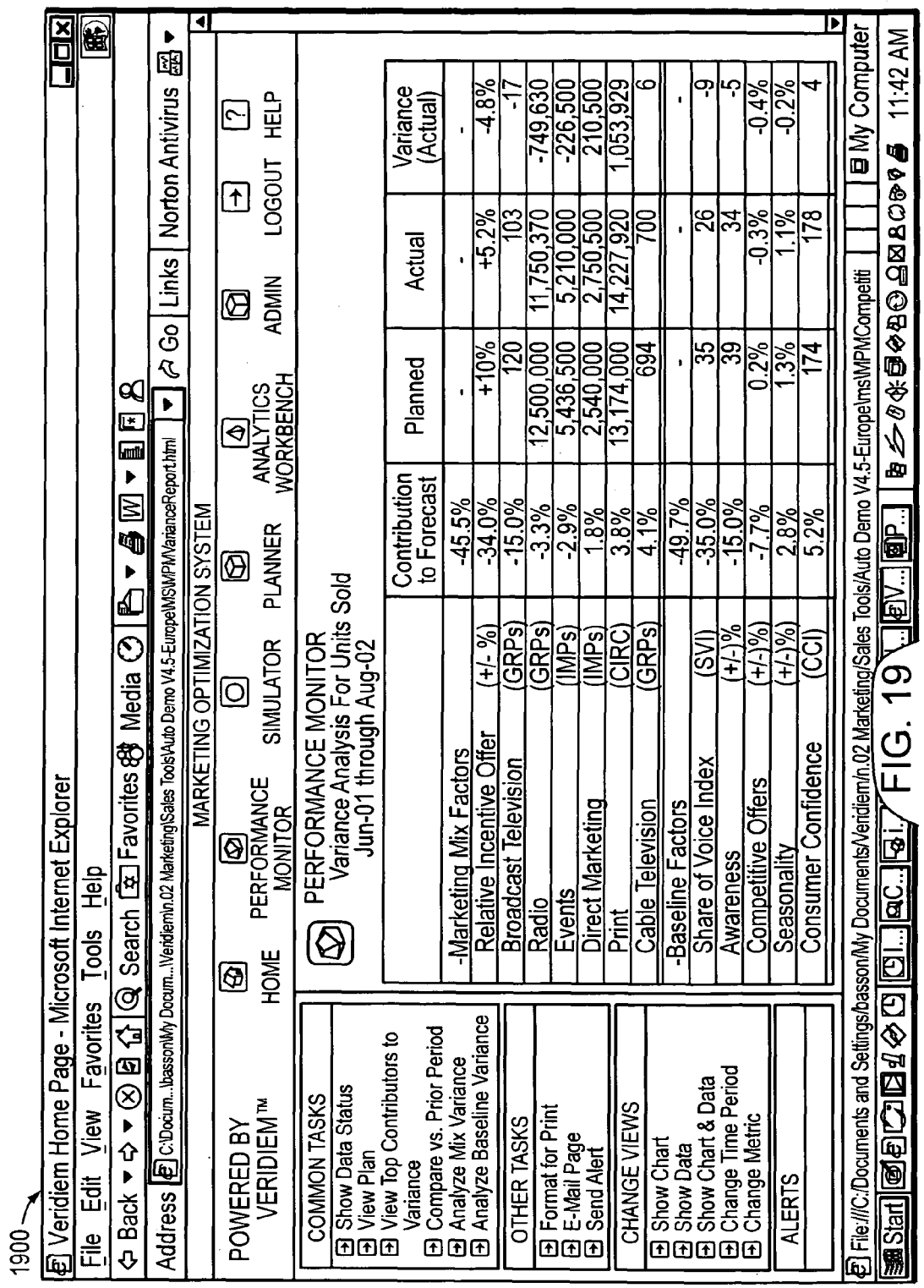
FIG. 19 is an embodiment of a screen shot of a variance analysis for units sold.
Figure 20:
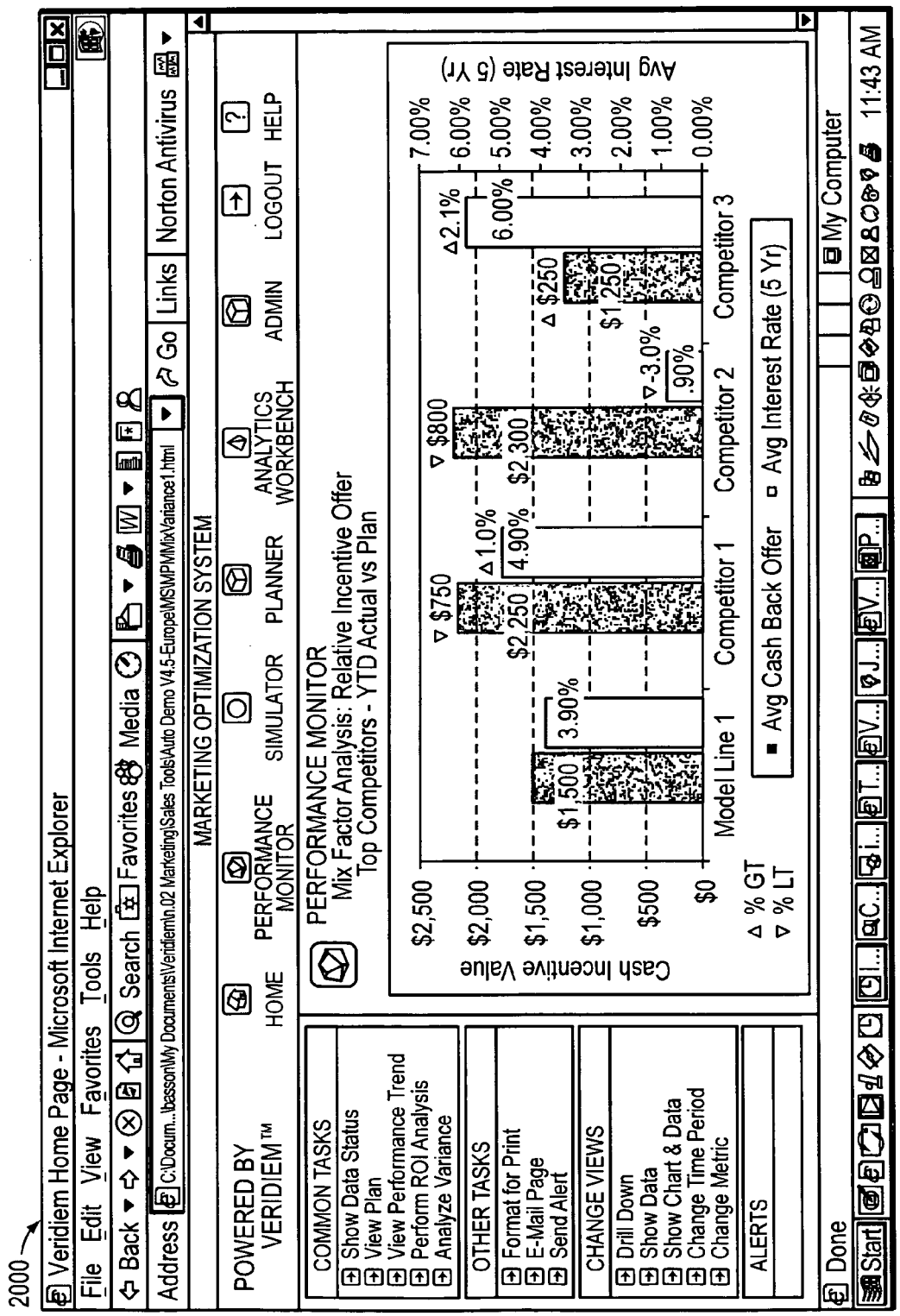
FIG. 20 is an embodiment of a screen shot of a mix factor analysis for an incentive offer.
Figure 22:
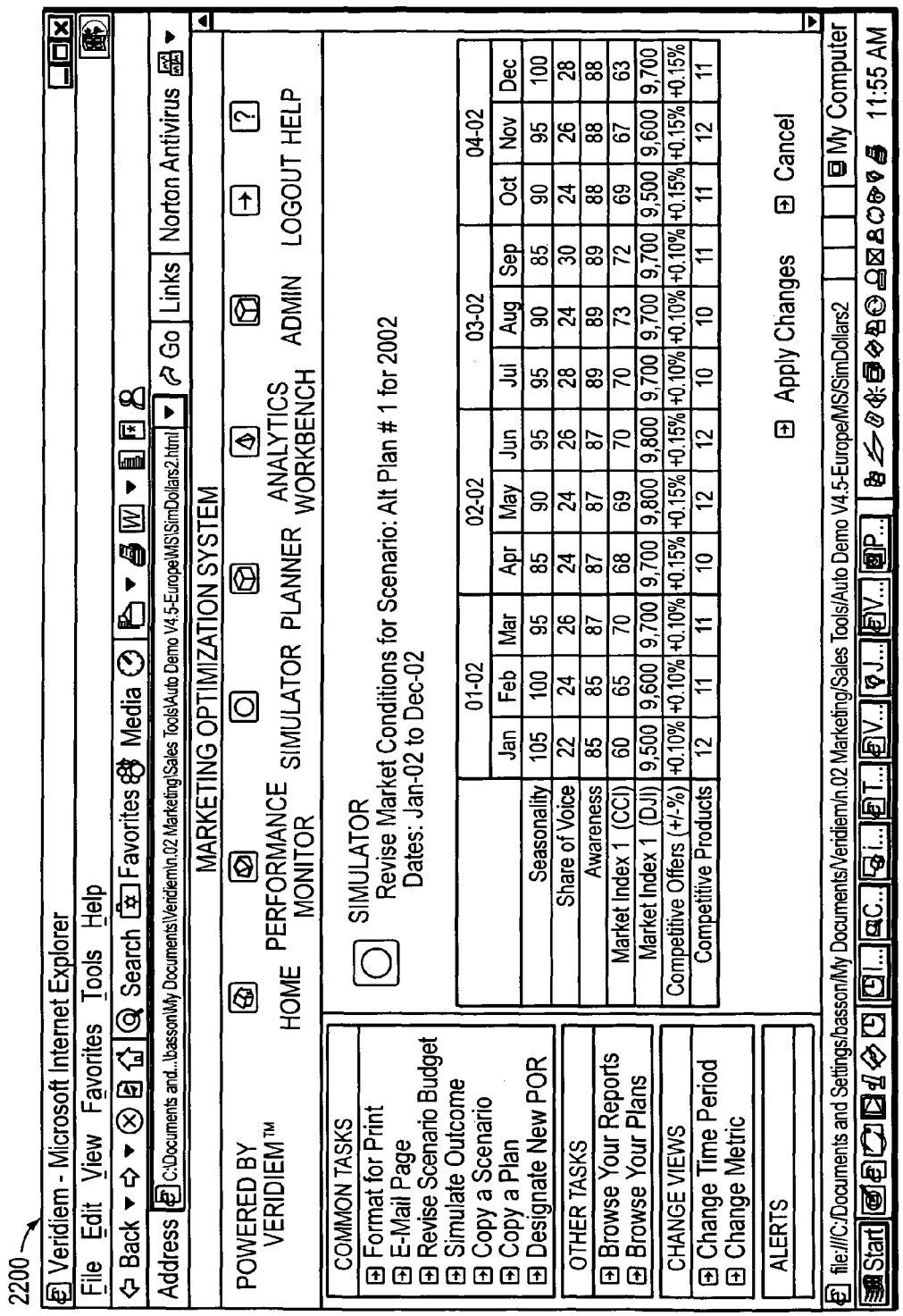
FIG. 22 is an embodiment of a screen shot providing more detail relating to the alternative plan of FIG. 21.
Figure 23:
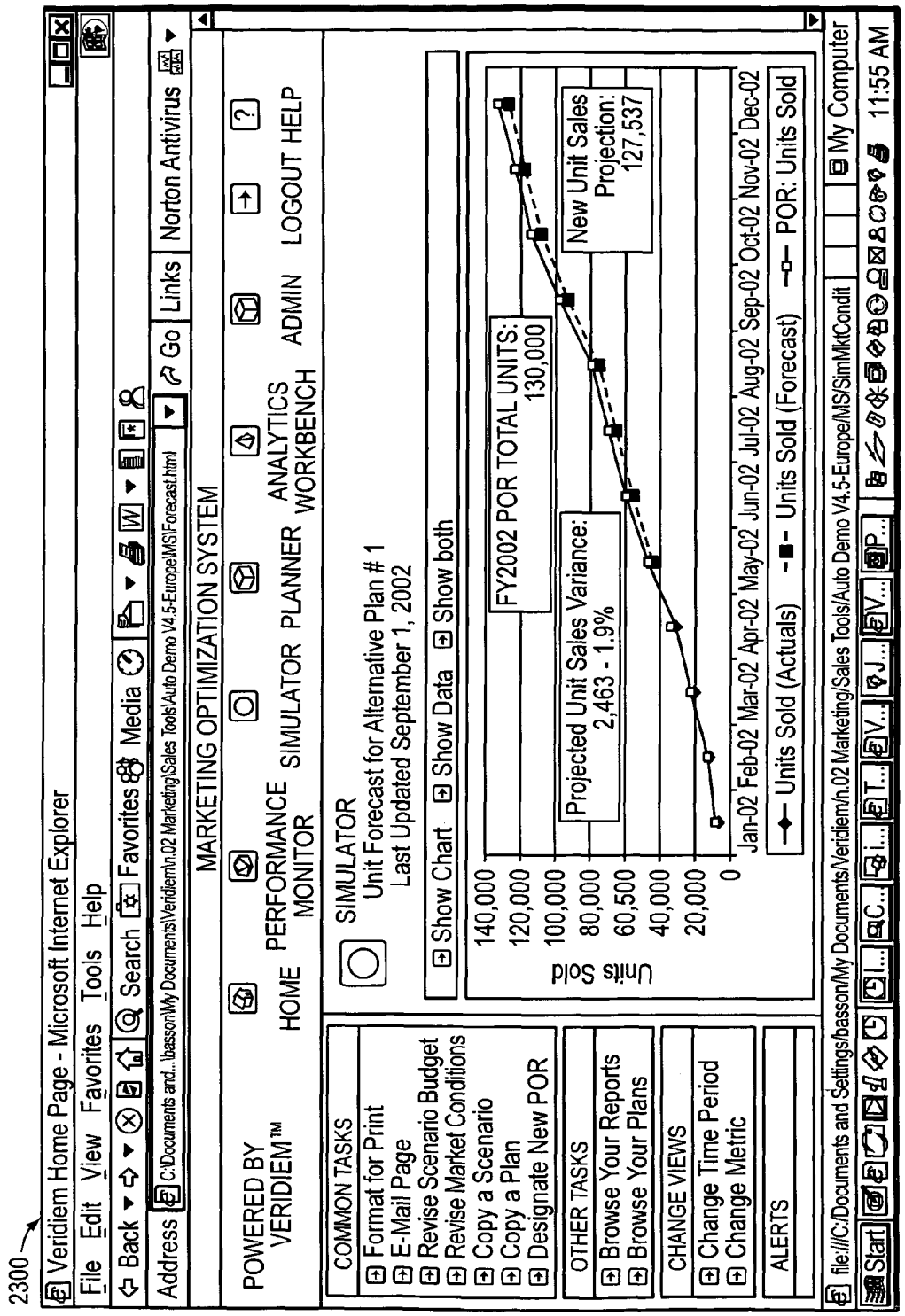
FIG. 23 is an embodiment of a graphical illustration of a unit forecast for the alternative plan of FIG. 21.

FIG. 15 shows a screen shot 1500 illustrating marketing impact for a portion of the marketing plan (i.e., model line 1 unit sales). FIG. 16 shows an exemplary screen shot 1600 displaying a graphical output of the marketing return for a portion of the marketing plan. FIG. 17 shows an exemplary screen shot 1700 illustrating a diminishing returns analysis for a portion of the marketing plan (e.g., for tier 1 television spending). FIG. 18 shows an exemplary screen shot 1800 displaying a year forecast for revenue. FIG. 19 is an embodiment of a screen shot 1800 of a variance analysis for units sold for a predetermined time period. FIG. 20 is a screen shot 2000 of a mix factor analysis for an incentive offer. FIG. 21 is a screen shot 2100 of a simulation of an alternative plan. The alternative plan includes a budget, pricing, and incentives. FIG. 22 is a screen shot 2200 providing more detail relating to the alternative plan of FIG. 21. FIG. 23 is a graphical illustration 2300 of a unit forecast for the alternative plan of FIG. 21.

Having described certain embodiments of the invention, it will now become apparent to one of skill in the art that other embodiments incorporating the concepts of the invention may be used. Therefore, the invention should not be limited to certain embodiments, but rather should be limited only by the spirit and scope of the following claims.

What is claimed is:

1. A computerized method of optimizing a marketing investment through one or more data processors having processor-implemented instructions, the method comprising:

automatically obtaining, through the processor-implemented instructions, multi-dimensional marketing data from a multi-dimensional database, wherein the multi-dimensional marketing data includes a plurality of data records, and wherein each data record has a value and a plurality of hierarchically-arranged dimensions;

using the multi-dimensional marketing data to define one or more models;

storing the multi-dimensional marketing data in a data staging area including a metadata repository, wherein the metadata repository includes metadata and one or more transformation rules used to transform the multi-dimensional marketing data into multi-dimensional formatted data;

receiving input to use the metadata and at least one transformation rule to transform the multi-dimensional marketing data into multi-dimensional formatted data, wherein the input is received through a graphical interface, and wherein transforming the multi-dimensional marketing data automatically classifies the multi-dimensional marketing data into at least one marketing category; and receiving a selection corresponding to a marketing investment, wherein the multi-dimensional formatted data is analyzed using the one or more models that correspond to the marketing investment, wherein analyzing produces multi-dimensional forecasted data corresponding to the marketing investment, and wherein the multi-dimensional forecasted data is used to optimize the marketing investment.

2. The method of claim 1, wherein classifying includes apportioning the multi-dimensional marketing data into at least one marketing category.

3. The method of claim 1, wherein classifying includes assigning the multi-dimensional marketing data to at least one marketing category.

4. The method of claim 1, wherein transforming includes aligning the multi-dimensional marketing data with pre-existing multi-dimensional marketing data in at least one marketing category.

5. The method of claim 1, wherein transforming includes integrating the marketing data with pre-existing multi-dimensional marketing data in at least one marketing category.

6. The method of claim 1, wherein marketing categories include marketing goals, financial plans, and technical plans.

7. The method of claim 6, wherein transforming includes linking together at least two marketing goals, financial plans, and technical plans.

8. The method of claim 1, wherein marketing categories include a plans and programs classification, a business results classification, a market factors classification, and an audience and segment classification.

9. The method of claim 1, wherein analyzing includes analyzing effectiveness of a marketing strategy.

10. The method of claim 1, wherein analyzing includes at least one of: analyzing return on investment, forecasting business results, tracking brand performance, analyzing brand performance, reviewing efficiency of an investment, and measuring a variance of the at least a portion of the multi-dimensional marketing data.

11. The method of claim 10, wherein forecasting business results includes demand forecasting and supply forecasting.

12. The method of claim 10, wherein measuring a variance includes alerting the market client of the variance.

13. The method of claim 1, further comprising:
monitoring a marketing metric of the multi-dimensional marketing data within the at least one marketing category.

14. The method of claim 13, further comprising:
reporting the marketing metric to a market client.

15. The method of claim 1, wherein analyzing includes at least one of: simulating a response to a marketing strategy to optimize the marketing investment, modeling a market to forecast results of a marketing strategy to optimize the marketing investment, creating an analysis path through the multi-dimensional marketing data optimizing consumer promotions, and annotating results of the analysis.

16. The method of claim 15, wherein modeling a market includes adjusting the marketing model to forecast results of a different marketing strategy to optimize the marketing investment.

17. The method of claim 1, further comprising:
enabling a user to analyze multi-dimensional marketing data in the marketing category to optimize a marketing investment.

18. The method of claim 17, further comprising:
automatically obtaining the user analysis.

19. The method of claim 1, wherein one of the dimensions of the multi-dimensional database is a time-based dimension; wherein the time-based dimension is arranged in a hierarchy of different time-based levels; and wherein the hierarchy of different time-based levels comprises different levels of specificity with respect to time.

20. The method of claim 19, wherein the different time-based levels include a month-based level and a quarterly period-based level.

21. The method of claim 19, wherein analyzing includes using an on-line analytical processing (OLAP) system to perform a multi-dimensional analysis on the formatted data.

22. The method of claim 19, wherein another of the dimensions of the multi-dimensional database is a product-based dimension; wherein the product-based dimension is arranged in a hierarchy of different product-based levels; and wherein the hierarchy of different product-based levels comprises different levels of specificity with respect to products.

23. A system, comprising:
one or more processors;
a computer-readable storage medium containing software instructions executable on the processor to cause the one or more processors to perform operations including:
automatically obtaining multi-dimensional marketing data from a multi-dimensional database, wherein the multi-dimensional marketing data includes a plurality of data records, and wherein each data record has a value and a plurality of hierarchically-arranged dimensions;
using the multi-dimensional marketing data to define one or more models;
storing the multi-dimensional marketing data in a data staging area including a metadata repository, wherein the metadata repository includes metadata and one or more transformation rules used to transform the multi-dimensional marketing data into multi-dimensional formatted data;
receiving input to use the metadata and at least one transformation rule to transform the multi-dimensional marketing data into multi-dimensional formatted data, wherein the input is received through a graphical interface, and wherein transforming the multi-dimensional marketing data automatically classifies the multi-dimensional marketing data into at least one marketing category; and receiving a selection corresponding to a marketing investment, wherein the multi-dimensional formatted data is analyzed using the one or more models that correspond to the marketing investment, wherein analyzing produces multi-dimensional forecasted data corresponding to the marketing investment, and wherein the multi-dimensional forecasted data is used to optimize the marketing investment 24. A computer-readable storage medium encoded with instructions that when executed, cause a computer to perform a marketing optimization method, comprising:

automatically obtaining multi-dimensional marketing data from a multi-dimensional database, wherein the multi-dimensional marketing data includes a plurality of data records, and wherein each data record has a value and a plurality of hierarchically-arranged dimensions;

using the multi-dimensional marketing data to define one or more models;

storing the multi-dimensional marketing data in a data staging area including a metadata repository, wherein the metadata repository includes metadata and one or more transformation rules used to transform the multi-dimensional marketing data into multi-dimensional formatted data;

receiving input to use the metadata and at least one transformation rule to transform the multi-dimensional marketing data into multi-dimensional formatted data, wherein the input is received through a graphical interface, and wherein transforming the multi-dimensional marketing data automatically classifies the multi-dimensional marketing data into at least one marketing category; and receiving a selection corresponding to a marketing investment, wherein the multi-dimensional formatted data is analyzed using the one or more models that correspond to the marketing investment, wherein analyzing produces multi-dimensional forecasted data corresponding to the marketing investment, and wherein the multi-dimensional forecasted data is used to optimize the marketing investment.

25. The method of claim 1, wherein analyzing includes using one or more algorithms to analyze the formatted data.

26. The system of claim 23, wherein analyzing includes using one or more algorithms to analyze the formatted data.

27. The method of claim 24, wherein analyzing includes using one or more algorithms to analyze the formatted data.

* * * * *

UNITED STATES PATENT AND TRADEMARK OFFICE
CERTIFICATE OF CORRECTION

| | | |
|---|---|---|
| PATENT NO. | : 7,904,327 B2 | Page 1 of 1 |
| APPLICATION NO. | : 10/426596 | |
| DATED | : March 8, 2011 | |
| INVENTOR(S) | : Phelan et al. | |

It is certified that error appears in the above-identified patent and that said Letters Patent is hereby corrected as shown below:

In column 25, line 8, insert a -- . -- after the word "investment".

Signed and Sealed this
Seventeenth Day of May, 2011

David J. Kappos
*Director of the United States Patent and Trademark Office*